(12) United States Patent
Warren et al.

(10) Patent No.: US 10,242,431 B1
(45) Date of Patent: Mar. 26, 2019

(54) OBSERVATIONAL DATA PROCESSING AND ANALYSIS

(71) Applicant: Descartes Labs, Inc., Los Alamos, NM (US)

(72) Inventors: Michael S. Warren, Los Alamos, NM (US); Ryan S. Keisler, Oakland, CA (US)

(73) Assignee: Descartes Labs, Inc., Santa Fe, NM (US)

( * ) Notice: Subject to any disclaimer, the term of this patent is extended or adjusted under 35 U.S.C. 154(b) by 0 days.

(21) Appl. No.: 15/249,324

(22) Filed: Aug. 26, 2016

Related U.S. Application Data

(60) Provisional application No. 62/210,982, filed on Aug. 27, 2015, provisional application No. 62/315,297, filed on Mar. 30, 2016.

(51) Int. Cl.
*G06T 5/00* (2006.01)
*G06T 11/60* (2006.01)
*G06T 5/50* (2006.01)

(52) U.S. Cl.
CPC ............ *G06T 5/002* (2013.01); *G06T 5/50* (2013.01); *G06T 11/60* (2013.01); *G06T 2207/10032* (2013.01)

(58) Field of Classification Search
USPC ........ 356/3.01; 382/100; 702/1, 3; 705/7.12, 705/7.25, 37; 706/21
See application file for complete search history.

(56) References Cited

U.S. PATENT DOCUMENTS

| | | | | |
|---|---|---|---|---|
| 6,990,410 B2* | 1/2006 | Boright | ............... | G06K 9/0063 382/100 |
| 7,031,927 B1* | 4/2006 | Beck | ............... | C02F 1/008 705/7.12 |
| 7,130,491 B2* | 10/2006 | Cheng | ............... | G06T 3/4007 382/300 |
| 7,184,890 B2* | 2/2007 | Boright | ............... | G06K 9/0063 702/3 |
| 7,212,670 B1 | 5/2007 | Rousselle | | |
| 7,570,783 B2* | 8/2009 | Wei | ............... | A01B 69/008 382/100 |
| 7,702,597 B2* | 4/2010 | Singh | ............... | G06Q 10/04 706/21 |
| 7,979,209 B2* | 7/2011 | O'Hara | ............... | G06K 9/0063 702/1 |

(Continued)

OTHER PUBLICATIONS

Shen et al., "An uneven illumination correction algorithm for optical remote sensing images covered with thin clouds," Remote Sens. 2015, 7, 11848-11862, Sep. 2015.*

(Continued)

*Primary Examiner* — Vu Le
(74) *Attorney, Agent, or Firm* — Van Pelt, Yi & James LLP

(57) ABSTRACT

Processing and analyzing observational data is disclosed. A set of data comprising at least a first tile and second tile is received. A first determination is made, for a first pixel position, which tile has a pixel with the highest value for that first pixel position. A second determination is made, for a second pixel position, which tile has a pixel with the highest value for that second pixel position. A composite image is generated using data obtained from the respective tiles in accordance with the two determinations.

27 Claims, 15 Drawing Sheets

(56) References Cited

U.S. PATENT DOCUMENTS

| | | | | |
|---|---|---|---|---|
| 8,548,248 | B2* | 10/2013 | Mitchell | G06K 9/00637 382/100 |
| 8,588,536 | B2* | 11/2013 | Dikbas | H04N 19/00484 382/232 |
| 8,594,375 | B1* | 11/2013 | Padwick | G06K 9/0063 382/103 |
| 8,655,070 | B1 | 2/2014 | Yang | |
| 9,001,311 | B2* | 4/2015 | Leonard | G01C 3/085 356/3.01 |
| 9,213,905 | B2* | 12/2015 | Lange | G06K 9/00805 |
| 9,721,181 | B2* | 8/2017 | Guan | G06T 7/194 |
| 9,875,430 | B1* | 1/2018 | Keisler | G06K 9/6276 |
| 10,095,995 | B2* | 10/2018 | Green | G06Q 50/02 |
| 2009/0022359 | A1* | 1/2009 | Kang | G06K 9/00657 382/100 |
| 2014/0012732 | A1* | 1/2014 | Lindores | A01B 79/005 705/37 |
| 2015/0371161 | A1* | 12/2015 | Mueller | A01B 79/005 705/7.12 |
| 2016/0180473 | A1* | 6/2016 | Groeneveld | G06Q 50/02 705/7.25 |
| 2016/0290918 | A1* | 10/2016 | Xu | G01W 1/10 |
| 2018/0293671 | A1* | 10/2018 | Murr | G06Q 50/02 |

OTHER PUBLICATIONS

M. C. Hansen et al. High-Resolution Global Maps of 21st-Century Forest Cover Change. Science, 342(6160): 850-853, Nov. 2013. Downloaded from: http://www.sciencemag.org/content/342/6160/850.

L. Oreopoulos, M. J. Wilson, and T. V'amai. Implementation on Landsat data of a simple cloud-mask algorithm developed for MODIS land bands. IEEE Geoscience and Remote Sensing Letters, 8(4):597-601, Jul. 2011.

Author Unknown, Common Land Unit (CLU), from the United States Department of Agriculture, downloaded from: https://www.fsa.usda.gov/programs-and-services/aerial-photography/imagery-products/common-land-unit-clu/index on Mar. 4, 2017.

Jayawardhana et al., Extraction of Agricultural Phenological Parameters of Sri Lanka Using MODIS, NDVI Time Series Data, In Procedia Food Science, vol. 6, pp. 235-241, ISSN 2211-601X, 2016.

Lopresti et al., Relationship between MODIS-NDVI data and wheat yield: A case study in Northern Buenos Aires province, Argentina, In Information Processing in Agriculture, vol. 2, Issue 2, pp. 73-84, ISSN 2214-3173, 2015.

Mumford et al., Optimal Approximations by Piecewise Smooth Functions and Associated Variational Problems, Communications on Pure and Applied Mathematics, Jul. 1989, vol. XIII, pp. 577-685.

Noureldin et al., Rice yield forecasting models using satellite imagery in Egypt, In The Egyptian Journal of Remote Sensing and Space Science, vol. 16, Issue 1, pp. 125-131, ISSN 1110-9823, 2013.

Rydberg et al., Integrated Method for Boundary Delineation of Agricultural Fields in Multispectral Satellite Images. IEEE Transactions on Geoscience and Remote Sensing, 39 (11), pp. 2514-2520. Nov. 2001.

Yan et al., Automated crop field extraction from multi-temporal Web Enabled Landsat Data, Remote Sensing of Environment, vol. 144, pp. 42-64, ISSN 0034-4257, https://doi.org/10.1016/j.rse.2014.01.006. Mar. 25, 2014.

* cited by examiner

|  | Beowulf (2003) | Cray XE6 | Cloud |
|---|---|---|---|
| Copy | 1203.5 | 2612.0 | 1753.9 |
| Add | 1237.2 | 2591.7 | 1731.4 |
| Scale | 1201.8 | 2820.3 | 1923.3 |
| Triad | 1238.2 | 2857.9 | 1953.2 |
| BT | 321.2 | 1445.1 | 1275.0 |
| SP | 216.5 | 706.0 | 464.1 |
| LU | 404.3 | 1599.0 | 1697.2 |
| MG | 385.1 | 1134.0 | 830.2 |
| CG | 313.1 | 380.2 | 326.6 |
| FT | 351.0 | 767.5 | 844.6 |
| Linpack | 3.30 | 14.94 | 25.46 |

FIG. 3B

| 2015 Cost ($/s) | Unit | Description |
|---|---|---|
| $1.0 \cdot 10^{-8}$ | Gigabyte | Cloud Storage |
| $1.5 \cdot 10^{-8}$ | Gigabyte | Persistent Magnetic Disk |
| $8.4 \cdot 10^{-8}$ | Gigabyte | Node Solid State Disk |
| $8.9 \cdot 10^{-7}$ | Gigaflop/s | Linpack Floating Point |
| $1.7 \cdot 10^{-6}$ | Gigabyte | Node Memory |
| $1.7 \cdot 10^{-4}$ | Gigabyte/s | Local Network |
| $1.0 \cdot 10^{-2}$ | Gigabyte/s | To Wide Area Network |
| $2.8 \cdot 10^{-2}$ |  | Skilled Human Labor |
| $1.2 \cdot 10^{-1}$ | Gigabyte/s | To Public Internet |

FIG. 3C

```
Obtain list of images to download

Optional [
    filter list of images [
        obtain metadata for images
        apply filter to select images of a given type or in a given region
            or for a given period of time
        ]
    ]

# Download data
For each image in list:
    Check if we have already retrieved image
    If not [
        Download image
        copy image to long-term cloud storage
        if download or copy fails:
            retry until success
    ]
```

FIG. 13

```
# Pre-process data
For each new image in cloud storage:
    Tile image
    Optional [ interpolate / reproject / convert to reflectance ]
    Copy processed image tiles to cloud storage
    if anything fails:
        retry until successs
    Put metadata entry in key/value store for each image tile
    ]
```

FIG. 14

OBSERVATIONAL DATA PROCESSING AND ANALYSIS

CROSS REFERENCE TO OTHER APPLICATIONS

This application claims priority to U.S. Provisional Patent Application No. 62/210,982 entitled SATELLITE IMAGE DATA PROCESSING AND ANALYSIS filed Aug. 27, 2015 which is incorporated herein by reference for all purposes. This application also claims priority to U.S. Provisional Patent Application No. 62/315,297 entitled CLOUD REMOVAL filed Mar. 30, 2016 which is also incorporated herein by reference for all purposes.

BACKGROUND OF THE INVENTION

The proliferation of transistors has increased the capacity and performance of computing systems by over a factor of a million in the past thirty years. One corollary of Moore's Law is the dramatically increasing amount of data in existence, driven by improvements in sensor, communication, and storage technology. One example of such data is observational data, such as satellite imagery data. Unfortunately, factors such as the sheer size of observational datasets, and the evolution of file formats for storing such datasets over the years, pose substantial logistical and computational challenges to entities wishing to use such datasets. Accordingly, there is an ongoing need for systems and techniques capable of handling large sets of observational data.

BRIEF DESCRIPTION OF THE DRAWINGS

Various embodiments of the invention are disclosed in the following detailed description and the accompanying drawings.

FIG. 3B shows a comparison of a 2003-era Beowulf cluster, Cray XE6 node, and 2015 Cloud performance.

FIG. 3C illustrates a brief summary of example computing costs.

FIG. 13 depicts an example of pseudocode for ingesting data.

FIG. 14 depicts an example of pseudocode for preprocessing data.

DETAILED DESCRIPTION

Figure 1:
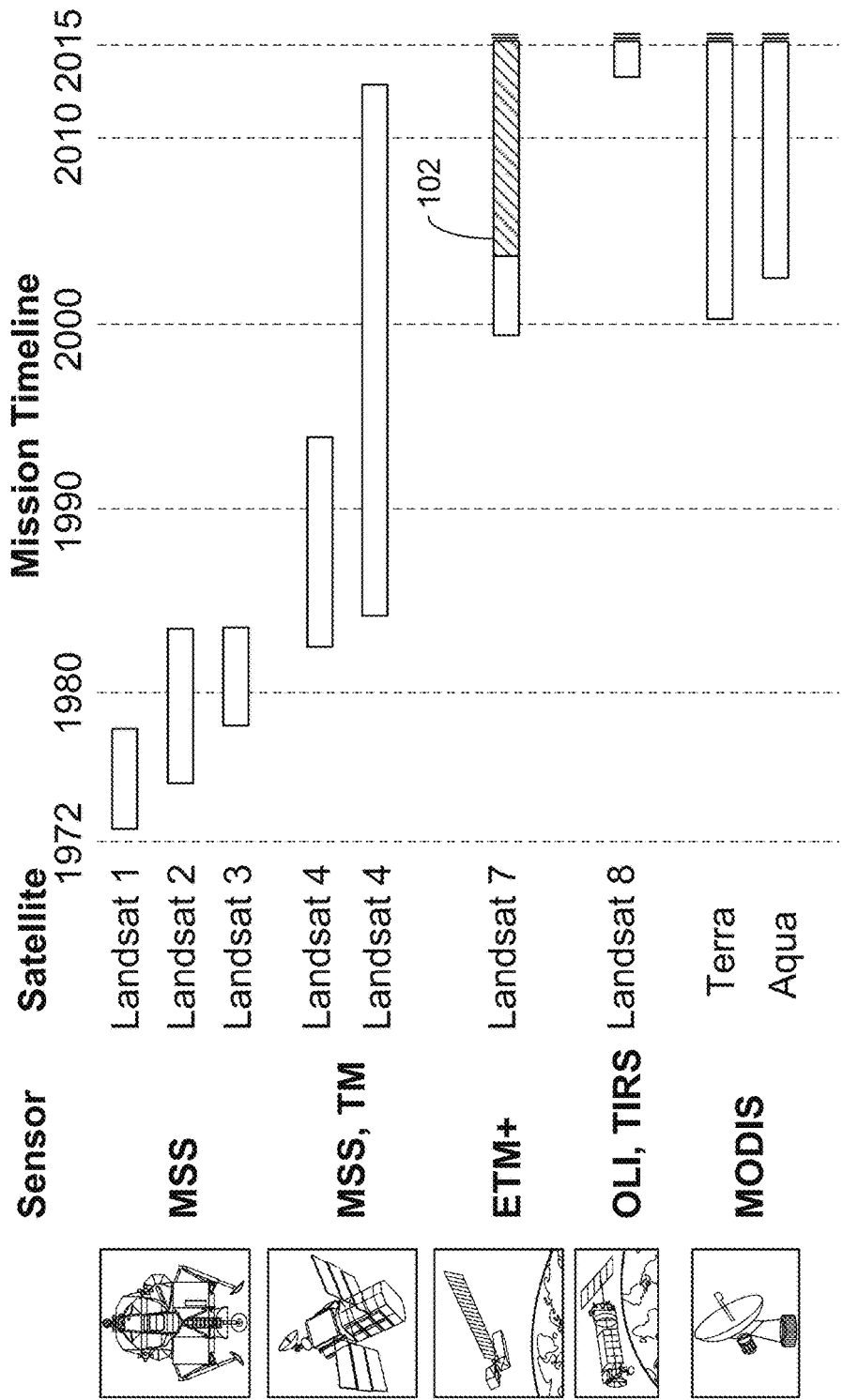
FIG. 1 shows NASA/USGS Landsat and MODIS satellites and sensors providing data that can be processed using embodiments of techniques described herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques described herein can be used to process and analyze data such as multi-decadal observations of the Earth by constellations of satellites. For example, described herein are techniques for operating on over a petabyte ($8\times10^{15}$ bits) of compressed raw data from 2.8 quadrillion pixels (2.8 petapixels) acquired by sources such as the U.S. Landsat and MODIS Earth remote sensing programs over the past forty years. As described herein, such data can be converted from a raw form to a calibrated, georeferenced, and multi-resolution tiled format suitable for further additional processing/analysis, facilitating further space and time-domain analysis, including fusion of the Landsat and MODIS (and other) datasets, as applicable. The techniques described herein are efficient—allowing, in various embodiments, for the processing, in less than a day, on generally available resources, over a petabyte of scientific data collected from the natural world. The techniques described herein can be deployed using commodity cloud computing resources (using a "Cloud architecture"), but can also be deployed using other architectures, including traditional high-performance computing architectures, in various embodiments, as applicable.

1. Overview

Overview of Example Data Sources

The NASA/USGS Landsat program has routinely collected approximately monthly snapshots of the world's land surface since 1972. The Landsat program has evolved over its lifetime, with the eight Landsat satellites hosting a series of moderate-resolution multispectral imaging systems, from the Multispectral Scanner (MSS), to the Thematic Mapper (TM) and Enhanced Thematic Mapper (ETM+), and most recently the Operational Land Imager (OLI) and Thermal Infrared Sensor (TIRS). FIG. 1 shows NASA/USGS Landsat and MODIS satellites and sensors providing data that can be processed using embodiments of techniques described herein. Landsat 6 failed on launch, and a failure in the Landsat 7 scan line corrector (SLC) is indicated in region 102. Complementing the Landsat program is a range of lower-spatial resolution systems optimized for daily global imaging, of which the most widely used is the Moderate Resolution Imaging Spectroradiometer (MODIS) instrument on the NASA satellites LOS Tena (launched 1999) and Aqua (launched 2002). Landsat and MODIS are two examples of sources of observational data. Other sources can also be processed/analyzed in addition to/instead of Landsat/MODIS data in accordance with various embodiments. For example, observational data collected from other constellations (e.g., PlanetScope and RapidEye), as well as higher-resolution imagery (e.g., collected via airplane/drones) can also be used in accordance with embodiments of techniques described herein.

Figure 2:
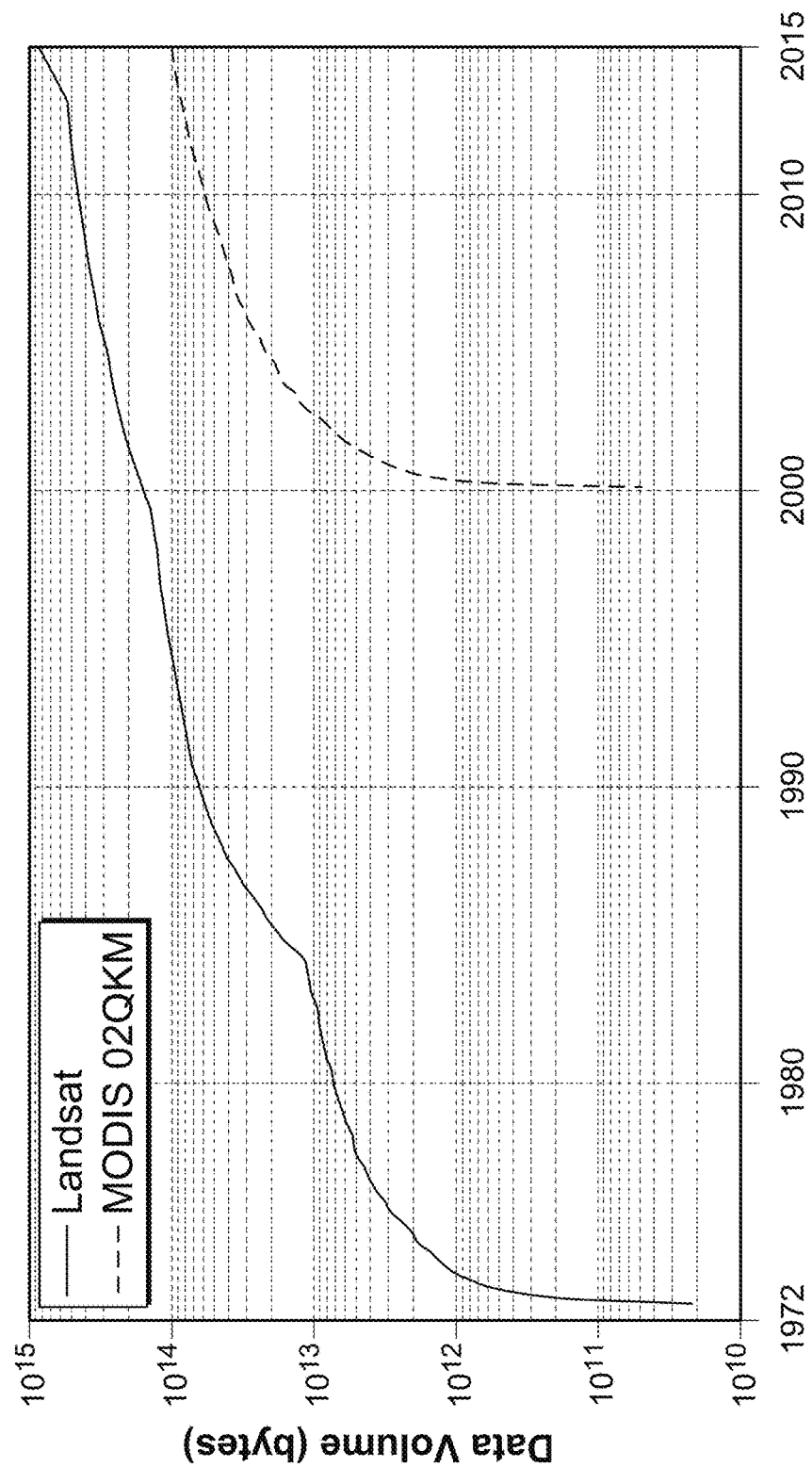
FIG. 2 shows the growth of Landsat and MODIS data volume over time.

FIG. 2 shows the growth of Landsat and MODIS data volume over time. To be most useful (e.g., to the community of researchers and policy makers), the Landsat and MODIS datasets need to be available globally on data systems that support high-bandwidth access, and the data itself needs to be stored in a data format that supports scientific analysis and is compatible with common visualization tools. At the time of the Landsat 1 launch on Jul. 23, 1972, the fastest computer in the world was the CDC 7600, capable of approximately 10 Mflops. Each Landsat 1 MSS scene consisted of 20 Mpixels (170 km×185 km image at 79 m ground sample distance in 4 spectral bands). The long-term storage options for these huge images involved magnetic tape and conversion to large-format photographic film. Hundreds of thousands of frames of photographic film remain in the USGS Eros data center, and efforts were taken in the early 1990s to convert the film data from Landsat 1 through 5 MSS and TM observations back to a digital format.

Google Earth Engine and the Amazon-NASA Earth Exchange (NEX) have placed historical (and are continuing to place newly-collected) Landsat and MODIS data into freely accessible storage in the cloud. Unfortunately, this data is often provided to the public in a format which requires more resources to store and process than necessary, and can prevent some forms of analysis entirely. As one example, bzip compressed tar files (often used to store such imagery) prevent random access to the data within them. Additionally, if answering a specific question requires access to the entire time series of data within a relatively small region (e.g., tens of kilometers), more than 1000 large image files spanning 185 km would need to be decompressed in their entirety, and then further spatially subdivided in order to fit within the memory of a processing node. However, if, as will be described in more detail below, the data is provided in a multi-resolution tiled format, only the data of interest needs to be accessed, reducing the cost and complexity by a large factor.

Overview of Infrastructure

Hardware

A variety of infrastructural approaches can be used to process data at a petabyte scale. One option is to purchase hardware, and install and maintain one's own computing center. One drawback of this approach is that, where the peak requirements are very large, but the typical workload is much smaller, resources will often go wasted through idleness. Further, this approach requires an appropriate knowledge of how to design and provision the hardware and software environment, possibly before having a complete understanding of the resources required to solve the data processing problem at hand. This solution also potentially comes with a multi-year commitment, since there is not much of a market for slightly used supercomputers.

A second option is to use shared supercomputing resources (e.g., provided by one's company, university, or national supercomputing facility). There are hundreds of supercomputing installations with more than 10,000 cores that could potentially provide for the on-node processing of the datasets described herein. Unfortunately, the associated storage and network resources are not so readily available. One major limitation to processing very large datasets using traditional supercomputing hardware is the difficulty of transferring the data to a parallel file system where it can be processed. At typical supercomputing center transfer rates, retrieving a petabyte from an archival storage location over the Internet could take a month or more.

Another issue is how to store the data while it is being collected. Parallel file systems commonly attached to supercomputers, such as Lustre and Panasas, have been designed for high performance, and their high cost limits their utility for long-term data storage. They are typically reserved for temporary, scratch storage. Lower cost archival storage such as magnetic tapes are available, but are not designed to support the use case of staging a petabyte at a time onto a parallel datastore. Yet another issue is how to perform further analysis and/or distribute results after a large data processing run has completed. Supercomputing centers typically do not provide a friendly environment for interactive data analysis and visualization, and additional infrastructure to provide web-enabled public or private access to large amounts of processed data can run afoul of traditional security models.

Instead of purchasing dedicated hardware to perform calculations, and/or performing them at an existing supercomputing center, an alternate approach is to leverage public cloud computing resources. Cloud computing represents a further step in the commoditization of computational resources, with associated benefits in agility, elasticity, and reliability. One aspect of cloud computing is that its pay-as-you-go model promotes transparency of resource costs, and thus allows free-market economic feedback loops which are largely suppressed in the traditional supercomputing environment. In the following discussion reference is made to Google Compute Engine, which is the Infrastructure as a Service (IaaS) component of Google Cloud Platform. Other platforms provided by other companies can also be used, and the techniques adapted as applicable.

Figure 3A:
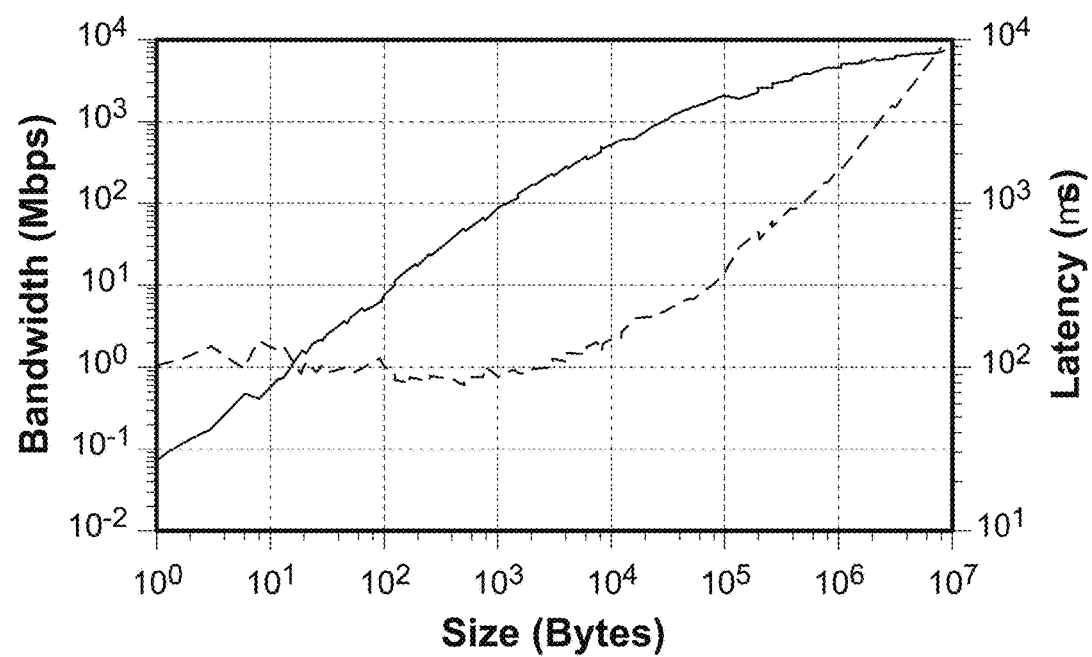
FIG. 3A shows bandwidth and latency for an example Google Compute Engine node.

Google Compute Engine became generally available in December 2013, and offers virtual machines using KVM as the hypervisor. Benchmarks connecting its node performance to a past Beowulf architecture and a recent HPC architecture are depicted in FIGS. 3A and 3B. In particular, FIG. 3A shows bandwidth and latency for a Google Compute Engine node. Small message latency is approximately 85 microseconds, while large message bandwidth reaches 7 Gigabits/second. FIG. 3B shows a comparison of a 2003-era Beowulf cluster Gordon Bell price/performance prize finalist to a Cray XE6 node and 2015 Cloud performance. The top set of results is memory bandwidth measured in Mbytes/s by the STREAM benchmark, the middle is from the Class C NAS Parallel Benchmarks in Mop/s, and last line is Linpack Gflop/s. Beowulf results are per CPU on a 2.53 GHz Intel Pentium 4. Cloud results are per HW core on a 16-core 2.3 GHz Intel Haswell node. Cray results are per Bulldozer compute unit of a dual-socket XE6 node with 2 AMD Interlagos model 6276 2.3 GHz CPUs (16 cores total). The data indicates that performance per core has progressed little in the past 12 years for un-tuned applications (between factors of 1 and 8, with most of these benchmarks around a factor of 3).

A brief summary of example computing costs is shown in FIG. 3C. The values are derived from published Google Cloud Platform pricing and example performance measurements taken in April, 2015. The numbers represent rough estimates, and substantial discounts can be obtained for particular workloads. Commodity bandwidths and capacities have been converted to a cost per second per giga-unit to facilitate total cost estimation. For example, storing one petabyte (1 million gigabytes) for one year (31.5 million seconds) in Cloud Storage costs $315,000. One dollar can currently buy a minute of programming labor, deliver 8 Gigabytes to the Internet, store a gigabyte in DRAM for 1 week, or provide $10^{15}$ floating point operations.

Figure 4:
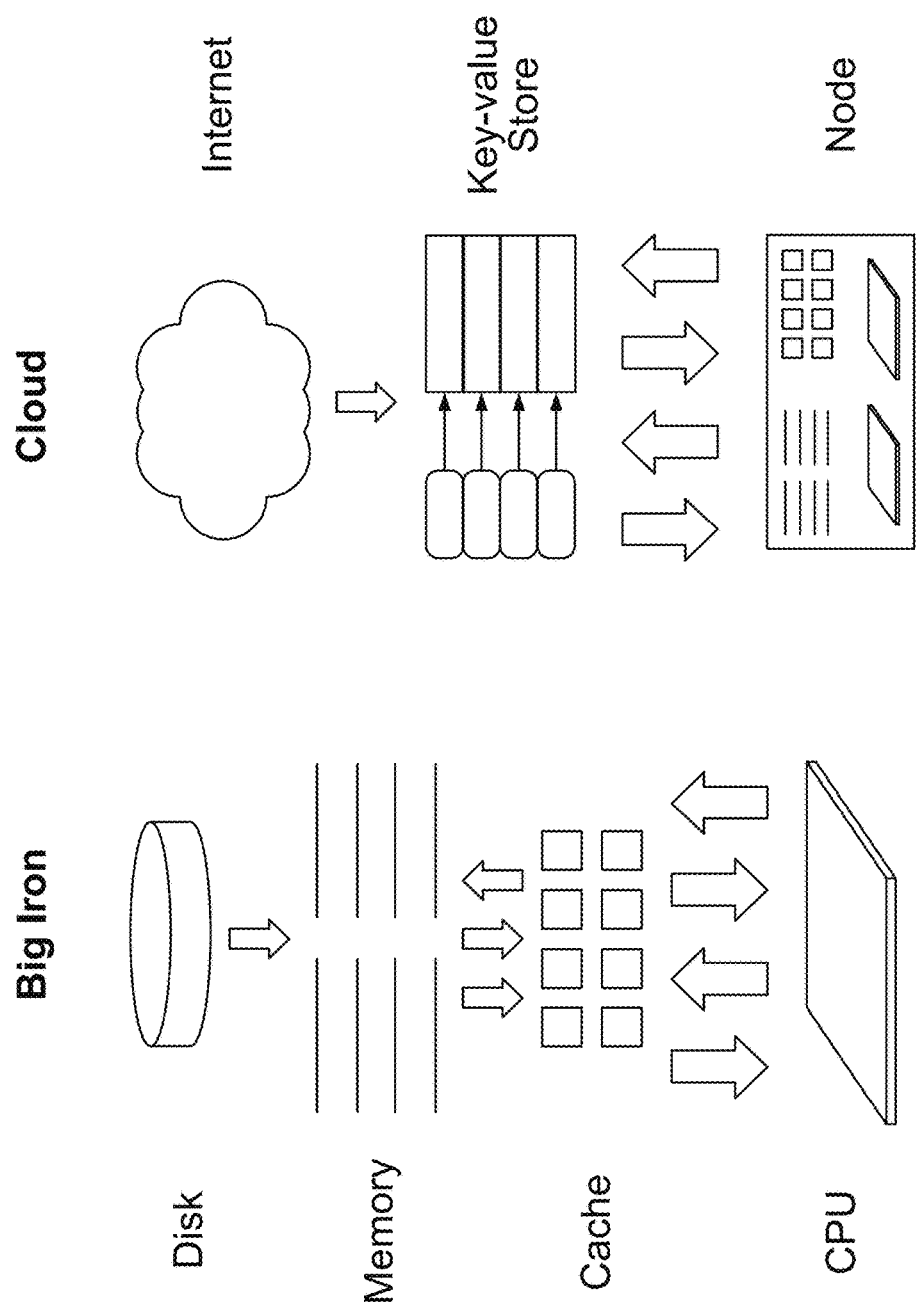
FIG. 4 illustrates a comparison between supercomputer architecture and cloud computing.

Many lessons gleaned from the past decades of supercomputing remain relevant to cloud computing with a translation between architectural components (e.g., where memory becomes a key-value store, and a CPU becomes the entire compute node). Where efficiency on a "Big Iron" supercomputer is most often dependent on dealing effectively with the limited bandwidth available from main memory, the equivalent limitation in the cloud is the network connection between the processing nodes and data storage. Techniques developed for "cache-friendly" algorithms to increase data locality can often be adapted for use in cloud architectures. An illustration of a comparison between supercomputers and cloud computing is shown in FIG. 4.

Figure 12:
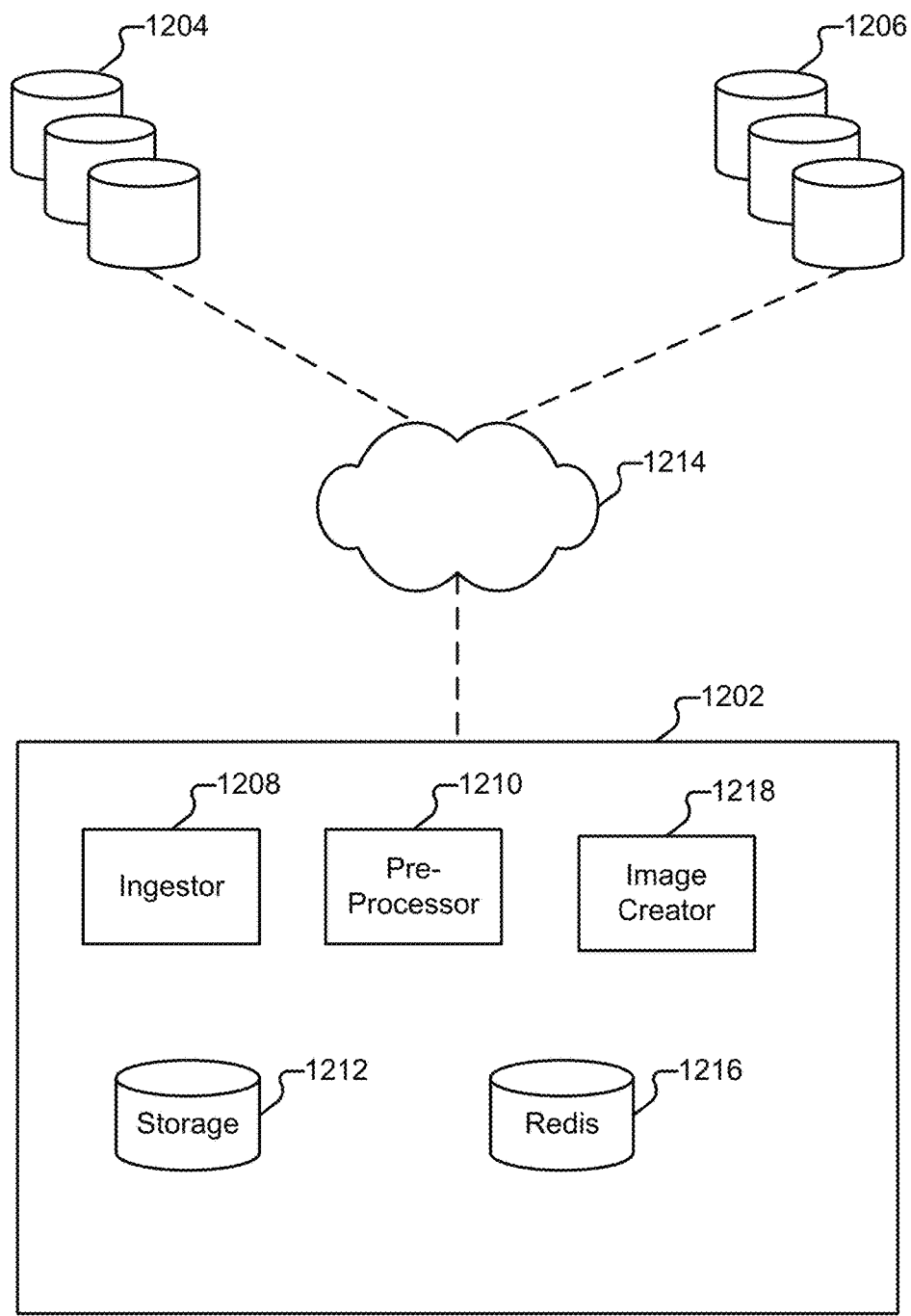
FIG. 12 depicts an example environment for processing and analyzing data in accordance with techniques described herein.

For the remainder of the Specification, reference will generally be made to various techniques being deployed using cloud computing resources. However, traditional standalone hardware can also be used, and the techniques described herein adapted as applicable. FIG. 12 (described in more detail below) depicts an example environment for processing and analyzing data in accordance with techniques described herein. As explained throughout the Specification, platform 1202 (and/or various elements thereof) can be implemented using traditional server hardware, and can also be implemented using cloud computing resources. Various elements of the environment shown in FIG. 12 are depicted as individual units (e.g., ingestor 1208 and pre-processor 1210). It is to be understood that such elements need not be implemented on a single node, but can also be implemented across multiple nodes configured to cooperate to perform tasks (e.g., leveraging various industry standard cloud computing techniques, as well as various approaches described herein). Further, whenever platform 1202 is described as performing a task, a single component, a subset of components, or all components of platform 1202 may cooperate to perform the task. Similarly, whenever a component of platform 1202 is described as performing a task, a subcomponent may perform the task and/or the component may perform the task in conjunction with other components. Various logical components and/or features of platform 1202 may be omitted and the techniques described herein adapted accordingly. Similarly, additional logical components/features can be added to embodiments of platform 1202 as applicable.

Software

The availability of useful, high-quality, and interoperable software packages continually increases (e.g., as the knowledge and effort of many software developers integrates over time in a code base counted in hundreds of millions of lines). The ecosystem that has developed around the collaborative development of software is a remarkable example of how the solution to a problem can be scaled across a large number of people. A corollary to the observation that there is vastly more high-quality open source software available now than there was in the past, is that much of the complexity of managing software has moved from writing one's own code, to interfacing one's code with software written by others.

Python offers a good compromise between rapid code development and high performance. Accordingly, in various embodiments, various pipelines (and/or components thereof) are predominantly written in Python, leveraging Numpy for numerical array operations. Cython is used as a glue to interface to other software libraries, and the Geospatial Data Abstraction Library (GDAL) is also used. The code is revision controlled with Git, which is also used as the vehicle for code deployment to worker nodes. Other languages/packages/etc., can also be used in accordance with various embodiments of the techniques described herein. As one example, a Landsat metadata file parser from the Landsat ecosystem disturbance adaptive processing system (LEDAPS) can be written in the C programming language, comprising approximately 500 lines of code, supporting either the old or new Landsat metadata format, depending on the version used. A Python metadata file parser in accordance with embodiments of the techniques described herein requires less than 40 lines, and can support both old and new Landsat metadata formats with the addition of an 80 line translation dictionary. Landsat metadata information can be propagated into an XML container within JPEG 2000 output files, providing a self-documenting provenance for the data the processing pipeline produces.

Various approaches can be used to reduce the cost of resources involved in the various kinds of processing and analysis described herein (examples of which costs are illustrated n FIG. 3C). For example, memory usage can be reduced to allow for execution on the smallest memory (and least expensive per core) Google Compute Engine nodes, which contain somewhat less than 2 GBytes of memory per hardware core, and use no conventional disk storage on the compute nodes at all (beyond the minimum 10 GB partition required to boot the system), working entirely in memory or from the Linux tmpfs RAM disk. As another example, intermediate writes to the local file system can be reduced, instead going from memory buffer to memory buffer between application libraries. As a specific example, rather than copying a bzipped Landsat image tar file from Google Cloud Storage to local storage and then decompressing and reading the file into memory, the data can be streamed directly into memory using a Python tarfile module reading from a gsutil cat pipe. The data in memory can then be passed directly to GDAL via the gdal.FileFromMemBuffer interface.

Initial Dataset—Landsat/MODIS

One example input dataset for use in conjunction with techniques described herein comprises $915.52 \times 10^{12}$ bytes of Landsat data in 5,693,003 bzip compressed GeoTIFF files (available at gs://earthengine-public/), and $101.83 \times 10^{12}$ bytes of MODIS Level 1B (2QKM) band 1 (red) and 2 (near infrared) data in 613,320 sz compressed Hierarchical Data Format (HDF4) files (e.g., collected from the NASA ftp site (1204) and stored in Google Cloud Storage (1212)), for a total of $1017.35 \times 10^{12}$ bytes and 6,306,323 files. The oldest image was collected Jul. 25, 1972, and (in this example data set) the recent image was collected on 2015-04-13 at 06:10:04Z. All of the input data is publicly available.

In various embodiments, the processing stages for each Landsat image in the dataset include: retrieving the image from Google Cloud Storage, uncompressing the image, parsing the metadata, identifying the bounding rectangle that contains valid data, cleaning the edges of the image, converting the raw pixel information into meaningful units (e.g., calibrated top of atmosphere reflectance using the appropriate constants for each satellite and accounting for solar distance and zenith angle), cutting each image into appropriately sized pieces using a consistent equal-area worldwide tiling of the sphere, performing any necessary coordinate transformations, compressing the data into a JPEG 2000 format (or another appropriate format), and storing the result back into Cloud Storage.

JPEG 2000 Image Coding

Aspects of JPEG 2000 include:

Rate-distortion performance that is somewhat superior to that of traditional JPEG at high bit-rates (i.e. low compression ratios) and substantially superior at low bit-rates (i.e. high compression ratios).

Much greater flexibility in terms of the types of images that can be coded, including single and multi-band images, and bit-depths between 1 and 32 bits per band (e.g., as compared to traditional JPEG).

Support for both lossless and lossy compression.

A scalable codestream that can be truncated to obtain a lower bitrate representation of the image of similar quality to that which would have been obtained if the image had been coded to target that reduced bit-rate. The codestream can be ordered for various forms of scalability, giving priority, for example, to either resolution (a high-fidelity low-resolution representation is obtained first) or fidelity (a low-fidelity full-resolution representation is obtained first).

The above features are all provided by the baseline, defined in "Part 1" of the standard, which also defines a standard file format for the codestream, referred to as JP2. Further flexibility, such as support for user-defined wavelet transforms and inter-band transforms, is provided by "Part 2" extensions to the standard, which also defines the more flexible JPX file format.

Generations of Landsat Imagery: MSS, TM, ETM+, AND OLI

Landsat images comprise 6 or 7 spectral channels, a higher-resolution panchromatic channel (only available in Landsat 7 ETM+ and Landsat 8 OLI), and one or more mask images. Example ways to combine groups of them are in the following set of JPEG 2000 encoded images in JP2 file format:

a three-band image comprising the spectral channels with the closest correspondence to visible red, green, and blue bands (lossy coding), a three-band image comprising the near infrared (NIR) and short wave infrared (SWIR) bands (lossy coding), a single thermal infrared (TIR) band (lossy coding), a single high-resolution panchromatic (PAN) band for ETM+ and OLI (lossy coding), a single band 1-bit image representing the data validity mask (lossless coding), and a single band 8-bit image representing the most important bit-planes in the Landsat 8 Quality Assessment Band (lossless coding).

The above layout does not fully exploit all of the flexibility of the JPEG 2000 standard, which would allow all bands to be included within a single JPX file, or all multispectral bands to be included as multiple components within the same JP2 file. Example reasons for this choice are (i) the optimum layout is strongly influenced by the optimal chunk size for access while minimizing costs for cloud file operations, and (ii) a JP2 file format was preferred over the more flexible JPX format due to the much wider support by libraries for decoding JPEG 2000 format images. In other embodiments, other layouts can also be used.

JPEG 2000 performance in reversible coding of bitplanes is inferior to that of a coding technique, such as JPEG-LS, specifically designed for this type of content. However, to avoid the complexity of using multiple coding standards, in various embodiments, JPEG 2000 is also used for bands of this type. A substantial performance improvement can be obtained, at the expense of losing resolution scalability, by effectively disabling the wavelet transform by setting the number of transform level to zero.

JPEG 2000 Parameters

Figure 5:
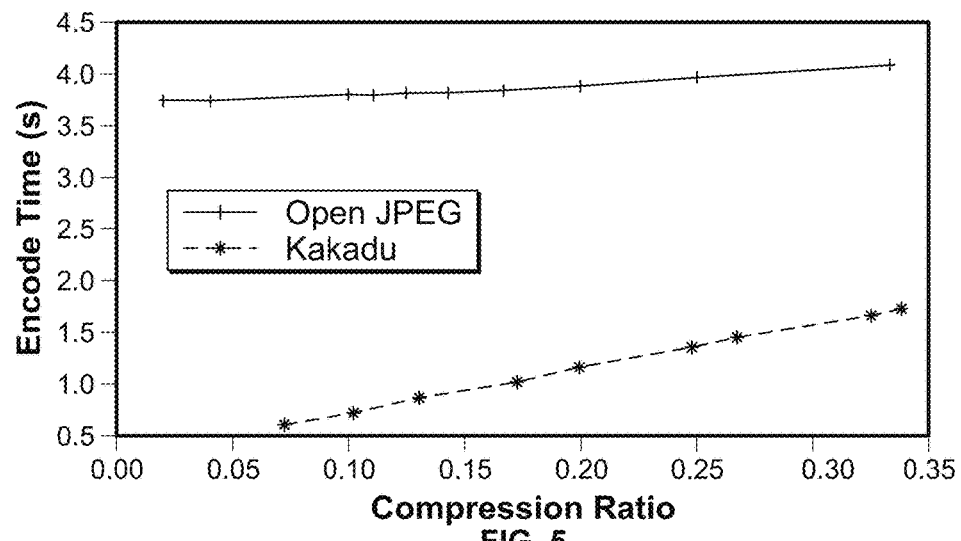
FIG. 5 illustrates a comparison of encode times for the OpenJPEG and Kakadu libraries for a 3-band 12-bit Landsat 8 image.

A variety of libraries can be used for manipulating image data. For example, the commercial Kakadu library can be used, as can an open-source option such as OpenJPEG. Using the Kakadu library offers an advantage in encoding speed, as illustrated in FIG. 5, which depicts a comparison of example encode times for the OpenJPEG and Kakadu libraries for a 3-band 12-bit Landsat 8 image. Reported times are averages over 10 runs. With respect to the data depicted in FIG. 5, Kakadu multi-threading was disabled to do a fair comparison for the environment, to account for the use of parallelism on a node at the task level.

One application of the imagery described herein is as an input to a classifier. In such a scenario, quality measures targeting perfectibility of distortion to a human viewer are generally not directly relevant. A compression ratio can be based on more meaningful criteria, e.g., by performing a classification experiment on processed JP2 imagery over a wide range of compression ratios. As one example, suppose for each ratio, thirteen 2048×2048 frames for the same spatial location (e.g., a region in Kansas) are selected from different times in 2011, and 1800 rows of pixels are used in each of the six spectral bands as training data, with the remaining 248 rows of pixels as testing data. The ground truth in this example is whether each pixel location is identified by the USDA CropScape Data Layer (CDL) as containing wheat. The 78-dimensional training inputs for each of the 3,686,400 training pixels can be input into an artificial neural network comprising three fully-connected layers, using the open source Caffe library. In this example, suppose the classification performance varies from 87.52% for uncompressed data to 87.13% for the most compressed imagery. A compression ratio can be selected such that it is sufficiently high to give a substantial reduction in storage costs, but for which image structure (e.g., edges) is just perceptible in the difference image between original and decoded images.

Figure 6:
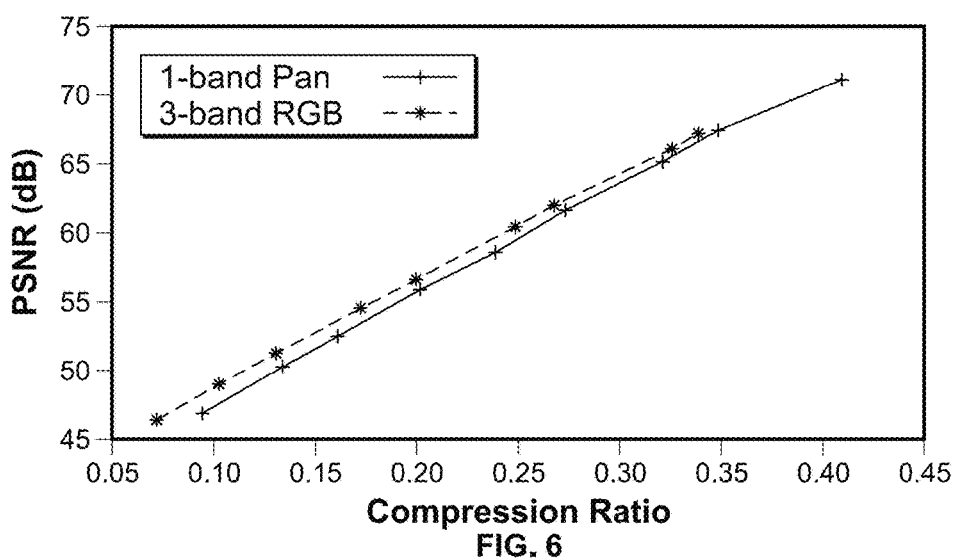
FIG. 6 illustrates an example of rate-distortion performance for Landsat imagery.

An example of rate-distortion performance for Landsat imagery is presented in FIG. 6. In particular, FIG. 6 depicts the JPEG 2000 rate-distortion performance for a single-band panchromatic image and a 3-band multi-spectral (RGB) image from the same Landsat 8 tile. The coding rate is measured in terms of compression ratio, and distortion is measured in terms of PSNR. In various embodiments, the desired level of compression is specified to the Kakadu encoder using the rate-allocation slope rather than a target bitrate (which is less robust to changes with image content in delivering a consistent reconstruction distortion).

Visualization in the Browser

Being able to quickly view and interrogate a given image or montage of images can be helpful for verification and validation of a processing pipeline. Unfortunately, even though the use of JPEG 2000 enables superior performance in terms of compression ratios and multi-resolution representation of imagery, modern web browsers such as Google Chrome, Mozilla Firefox, and Apple Safari do not natively support the format. Accordingly, output JP2 files that could otherwise be viewable directly in the Google Developers' Console Storage Browser must first be downloaded to a local workstation and viewed using an image viewer capable of parsing JP2 files. The situation is aggravated by the files having up to 10 different components, requiring the usage of layout-specific visualization scripts. One solution is to use a Google Chrome Javascript-based extension to view images directly from within the web browser. While an entire JP2-capable parser can be purely in Javascript, in various embodiments, the Emscripten LLVM compiler toolchain is used to compile the C99 OpenJPEG 2.1.0 library to LLVM bytecode and translate the result into optimized Javascript. The base library can be augmented by implementing additional C library functions that are used to specify additional decoding parameters and yield direct access to image component data without first writing to a temporary PNG or RAW image. An HTML5 Canvas object can then be filled with the data array, providing scaling and gamma correction functionality through a simple web GUI. This moves the image inspection procedure directly to wherever the data resides (in terms of its location on a website). Progressive decoding of the bytestream can be performed as it arrives from the server, allowing for a seamless integration into traditional websites.

Example System and Environment—Google Compute Engine

As explained above, in various embodiments, the data processing and analysis techniques described herein are implemented using commercially available public cloud resources with an on-demand cost model. These include Google Cloud Platform resources, such as Compute Engine and Cloud Storage, but other platform resources by other vendors can also be used, as applicable (e.g., as offered by Amazon). Cloud vendors such as Google divide physical hardware into virtual resources to divide workloads into isolated environments, which allows customers to use compute capacity with an on-demand cost model. Once the task is complete, the customer can deprovision the system, ending their costs. The virtual infrastructure and its underlying physical resources can then be returned to the available resource pool for the next customer to use. Construction and management of data centers, purchasing of hardware, utilities, and staffing are all removed for the task of building a large distributed system. This allows for focus on the actual problem being solved. Google currently has four geographic availability zones in its us-centrall region, any/all of which are used in various computations described herein. Geographical diversity creates design options for robust failover and scaling.

Google Compute Engine allows for development teams to specify virtual hardware such as CPU, RAM, SSDs, network, security, etc., along with software such as an operating system, custom software, and dependencies. This flexibility allows the costs and benefits of different hardware to be factored into the software engineering decision process, as a tradeoff against the cost of optimizing the code to work with lower priced virtual hardware. In various embodiments, worker nodes comprise four virtual machine CPU (vCPU) models, based on what is available in the four geographic zones. Examples are as follows:

| Zone | Virtual Machine | CPU Hardware |
| --- | --- | --- |
| us-central1-a | highcpu-16vCPU | Intel Sandy Bridge 2.6 GHz Xeon E5 |
| us-central1-b | highcpu-16vCPU | Intel Haswell 2.3 GHz E5 v3 |
| us-central1-c | highcpu-32vCPU | Intel Haswell 2.3 GHz E5 v3 |
| us-central1-f | highcpu-32vCPU | Intel Ivy Bridge 2.5 GHz E5 v2 |

Other virtual hardware specifications such as RAM, SSD, and network are identical across zones. Software is identical with the exception of worker processes corresponding to the vCPUs available. Zone variations (primarily 16 and 32 vCPU instances) necessitate multiple VM templates. Datacenter regions also allow the specification of templates inside a group, such as the specification of the number of VMs to be created, and auto-scaling of the group based on factors such as network traffic or CPU load.

Example Software Deployment and Configuration

In various embodiments, software deployment and configuration is accomplished with two techniques: bash scripts and Linux containers (e.g., Docker). VM templates allow for a custom script to be specified and executed post startup. With the bash script technique, the code is pulled from a private Github repository along with dependencies, and configuration files deploy the code onto the virtual machines and start the worker processes. In the second approach, a pre-built Docker container that contains source code, dependencies, and configurations built inside the container is deployed onto the VM and the container is executed in daemon mode. Docker containers provide an API around several Linux kernel features (libvirt, LXC, systemd, and libcontainer) to create an isolation mechanism from the host OS while utilizing the existing Linux kernel. Traditional virtual machines fully isolate operating systems on top of a hypervisor. Docker containers also use a copy-on-write layered file system approach where identical layers need not be duplicated, creating considerably smaller storage requirements than traditional virtual machines. Because the container is leveraging the existing kernel's CPU, memory, and network, additional performance overhead can be minimal. Containers can be executed on both virtual machines and bare metal hardware, which provides an efficient mechanism to move configured, functional, versioned, compute capabilities to where the data resides, which often could be a different cloud vendor, private datacenter, or collaborator's laptop. Just as source code can be branched and versioned inside modern source code repositories such as Git, pre-built containers can be versioned and branched in container repositories at a fraction of the size of versioning virtual machines, since only the changes in the layered file system are differentiated. In an example deployment, containers are built with all required dependencies, configurations, and source code from GitHub, and then stored in a private Google Container Registry located inside a Google Cloud Storage bucket. This allows for the latest container to be pulled down and executed in daemon mode on startup in a consistent manner across the cluster. Containers also provide a reproducible archival mechanism for others to later execute code to attempt to duplicate results with minimal effort. The time from the initial virtual machine creation command to the worker node starting tasks from the task queue is two minutes in an example run.

The Landsat dataset is stored inside Google Cloud Storage as a publicly available dataset, persistent and accessible from all four us-central zones. As an alternative to using a large NFS for all worker nodes to write results, Google Cloud Storage buckets can be used as a persistent, common datastore across all nodes. As a further benefit, this data is also available in other geographical zones, enhancing availability and tolerance to hardware failures.

To manage the creation of asynchronous tasks for processing millions of scenes across the worker nodes, an asynchronous task queue approach (e.g., the Python Celery library) is used in some embodiments. Celery's API allows multiple asynchronous job queues to be created, the list of tasks and their parameters to be managed, and for their insertion into a pluggable backend key-value pair store (e.g., Redis). As worker nodes are provisioned and start, they connect to the Celery broker to receive processing tasks in the queue. To optimize performance, Redis can be configured to keep the queue in memory.

Scalability and Performance—Example Execution

In one example execution (e.g., of the tiling process described in more detail below), processing of a petabyte of satellite imagery begins at 02:15 UTC, when 250 nodes in zone us-central1-f are started, processing Landsat TM images. Additional compute instances are then created across zones a, b, c, and f, accounting for approximately 15,000 physical compute cores. At 11:34 UTC, nodes running the MODIS processing pipeline are started, and an equivalent number of Landsat nodes are shut down. At 15:45 UTC, a list of tasks which have not completed and have not been automatically re-tried by the task manager is resubmitted. By 16:15 UTC, the bulk of the Landsat tasks are complete, and the remaining Landsat MSS tasks are added. At 17:11 UTC, the MODIS processing completes, and at 17:41 UTC on April 16 all tasks have completed.

Figure 7:
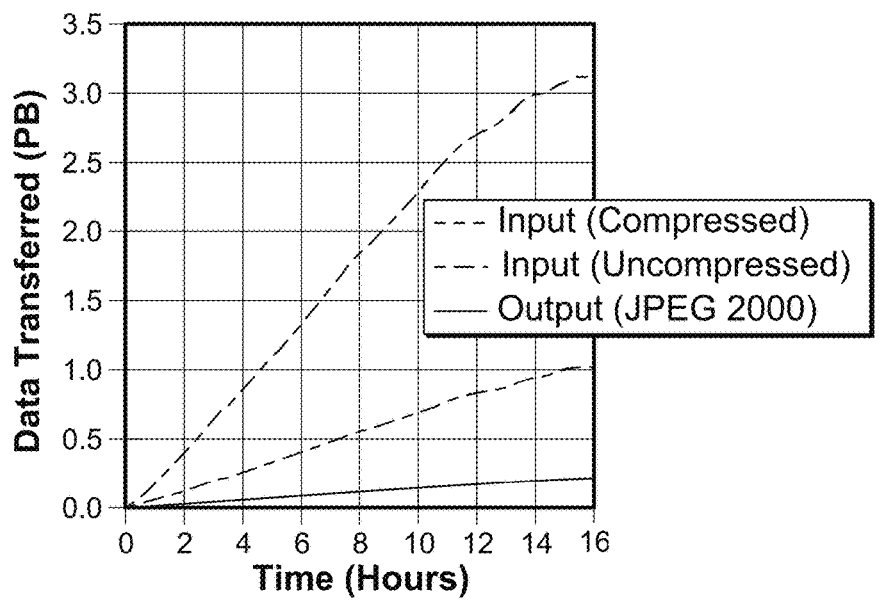
FIG. 7 depicts progress of an example imagery processing job.

FIG. 7 depicts progress of the aforementioned processing over 15.5 hours. The petabyte of input data is read from the distributed Google Cloud Storage system at an average rate of 18.1 Gbytes/sec. After decompression, this represents 55.2 Gbytes/sec into processor memory. The peak input network bandwidth exceeds 25 Gbytes/sec (200 gigabits/sec). The output bandwidth back to Google Cloud Storage averages about 4.5 Gbytes/sec, written to over 185 million individual files.

Figure 8:
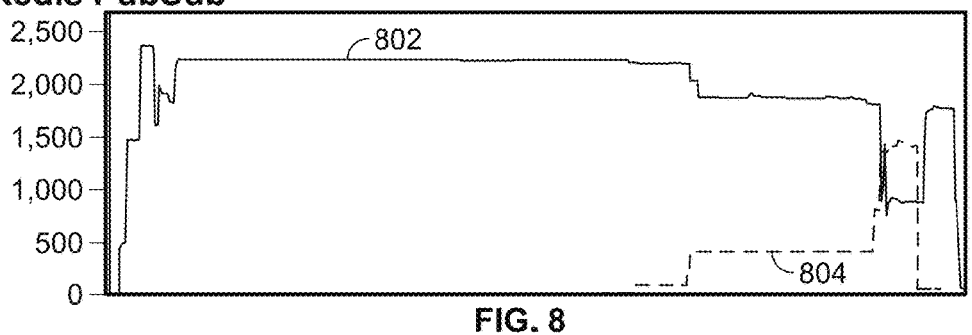
FIG. 8 illustrates the number of nodes involved for each phase of an example imagery processing job.

The number of nodes involved for each phase of the above example execution is shown in FIG. 8 (counting one publisher and one subscriber on each node, with a mix of 8-core and 16-core machines). In particular, the number of publishers and subscribers during the calculation derived from the Redis system used as a backend by the Celery task manager is shown. Line 802 shows Landsat tasks, and line 804 shows MODIS tasks.

Figure 9:
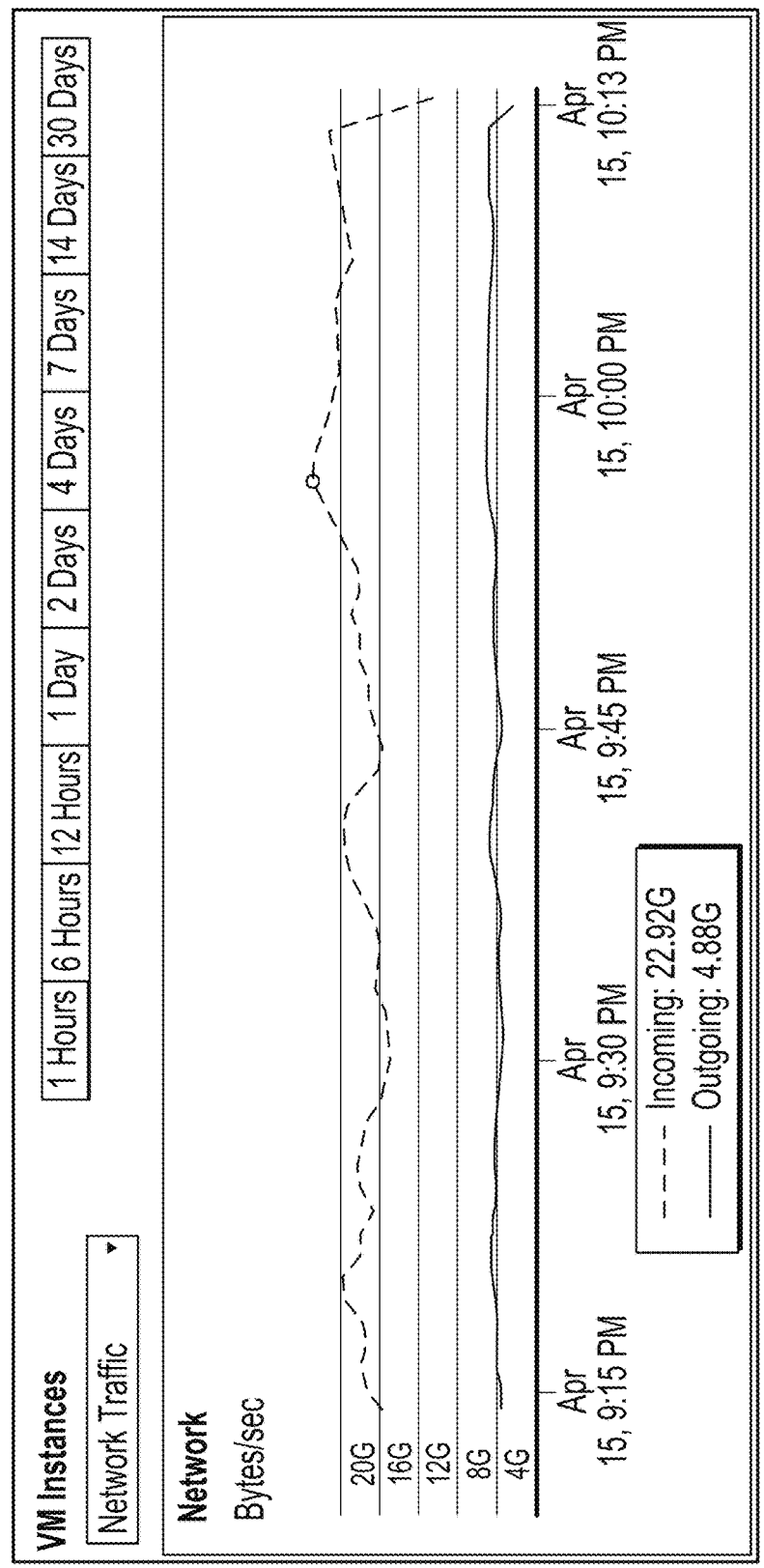
FIG. 9 depicts output from the Google Developer Console showing network bandwidth in and out of compute nodes during an hour slice.

FIG. 9 depicts output from the Google Developer Console showing network bandwidth in and out of compute nodes at hours 3-4 of the process, showing typical bandwidths above 16 Gbytes/sec, with the peak at nearly 23 Gbytes/sec.

Figure 10A:
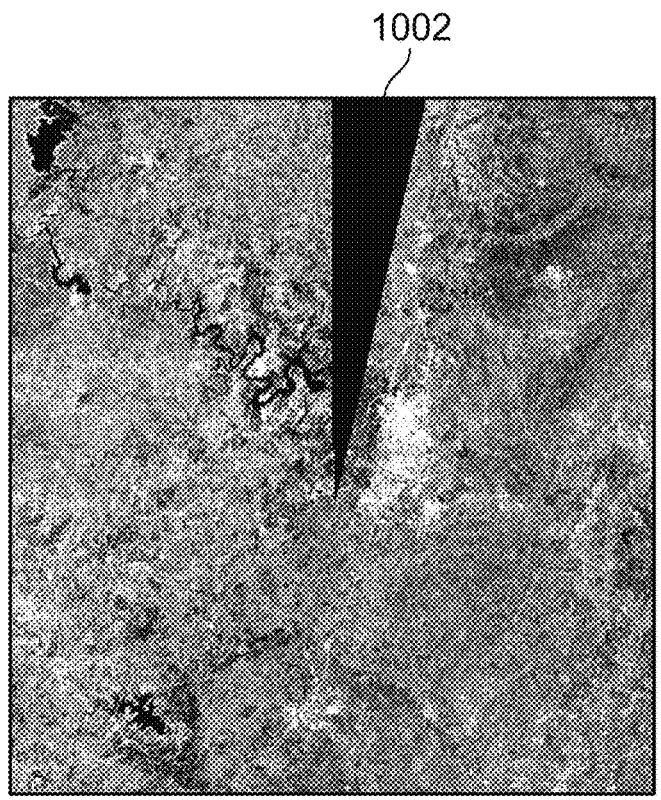
FIGS. 10A-10C illustrate processed tiles.
Figure 10B:
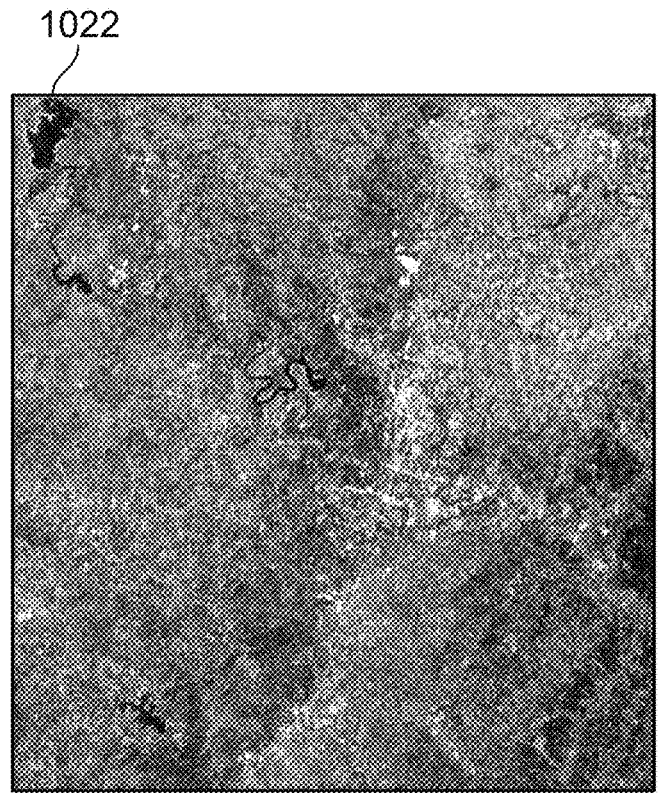
Figure 10C:
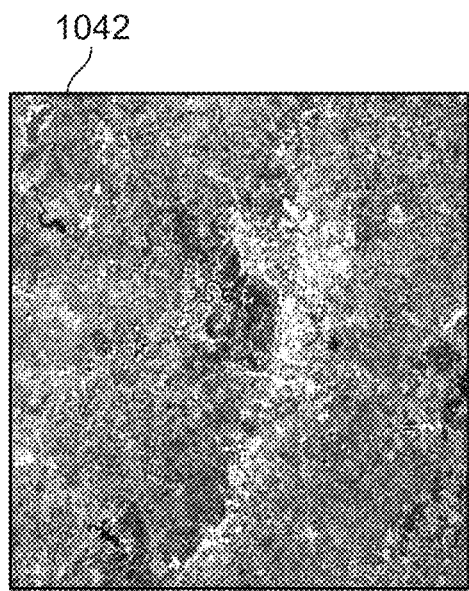

FIGS. 10A-10C show examples of processed tiles of the Austin, Tex. area. FIG. 10A depicts March 1973 (Landsat 1 MSS), FIG. 10B depicts September 1994 (Landsat 5 TM, 10B), and FIG. 10C depicts March 2015 (Landsat 8 OLI, 10C), respectively. The tiles are 2048×2048 pixels, and are calibrated and georeferenced. The Landsat 1 image (FIG. 10A) is a false-color image (RGB display channels mapped to near IR, visible red, visible green), due to the MSS sensor lacking a visible blue band. All three panels are composites of four processed tiles, where each panel is formed from tiles collected over several days, showing the consistency of the processing across Landsat scenes and between sensors. Region 1002 in FIG. 10A is a region where no data was available in that Landsat 1 MSS observation. Changes in the extent of urbanization surrounding Austin are clearly visible from panel to panel, as is a significant change in Buchanan Lake between FIGS. 10B (region 1022) and 10C (region 1042).

2. Ingestion and Pre-Processing

Figure 11:
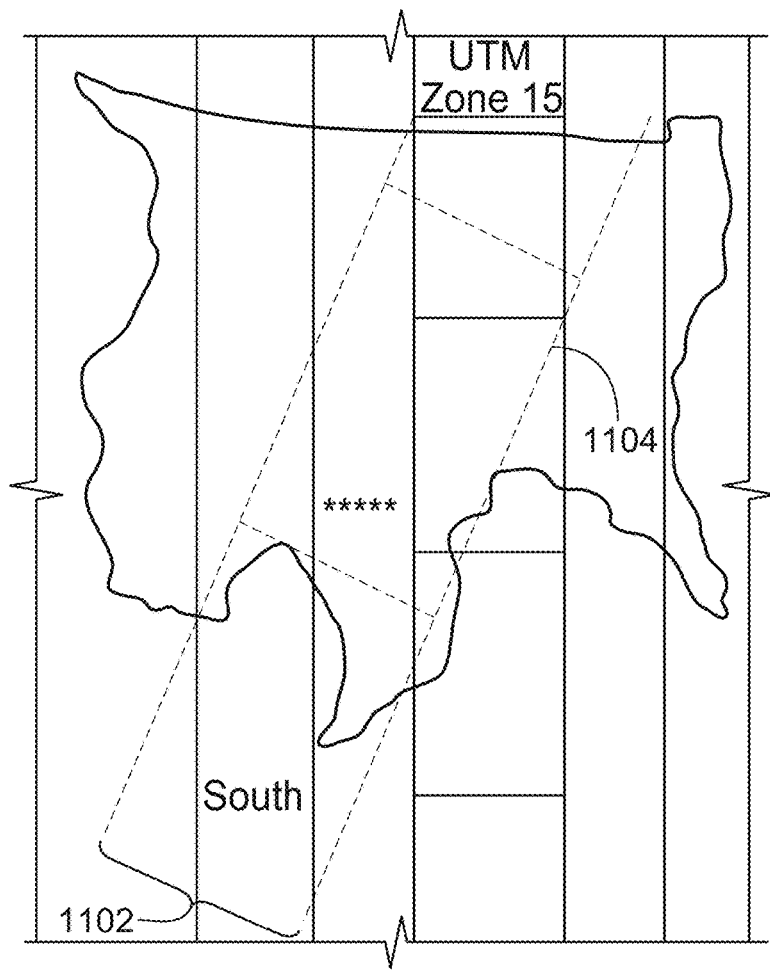
FIG. 11 depicts an illustration of the United States, as observed from satellite.

FIG. 11 depicts an illustration of the United States, as observed from a satellite. In particular, FIG. 11 illustrates a granule (1104) of data—five minutes' of orbit along a swath (1102). The path of the spacecraft is down through the center of the swath.

Map Projections

Two common map projections which represent the spherical surface of the Earth as a regular grid are the Web Mercator projection and the Universal Transverse Mercator (UTM) projection. A single image of the Earth with pixel scales less than about 10 km is too large to process efficiently, so the map must be "tiled," or split into pieces which can be processed independently.

The Web Mercator projection can readily be tiled, because the image dimensions are precisely a power of two in both coordinates. The level of the decomposition divides the world into $4^n$ level pieces. An appropriate level can be chosen to satisfy various constraints, mainly, that the number of time slices of a given tile that can fit into processor memory at one time. Web Mercator is suitable for simple map interfaces, but is problematic for applications beyond simple analysis because the pixel areas are not equal: as a pixel becomes farther from the equator, it represents a smaller and smaller area on the surface of the Earth.

The UTM projection is not as simple. UTM first splits the world into 60 zones, and within each zone pixels are split into nearly equal areas referenced by their "x" or "Easting" coordinate and their "y" or "Northing" coordinate. All UTM distances are measured in meters. The number of pixels which span a zone in the East-West direction depends on the distance from the equator.

For the MODIS sensor carried on the Aqua and Tena satellites, sensor values come as a logically rectangular grid of latitude/longitude co-ordinates (a swath), but projected on to the surface the sample points are not on a regular grid (points become farther apart towards the edges of the swath). For other sensors, the image values are delivered in UTM coordinates. A shared, common coordinate reference system can be used to further the most efficient and accurate processing of multiple datasets. Most of the input data is delivered in UTM coordinates, and operations to interpolate pixels to a different map projection or resolution can affect the data quality and require additional computational resources. Accordingly, in various embodiments, UTM is used as a common map projection. The tiling techniques described herein can also be adapted for use with other projections, as applicable.

UTM Tiling Parameters

UTM tiling (e.g., as used by embodiments of platform 1202) can be described by a number of parameters. It is applied to each of the 60 UTM zones with identical parameters, with the zone designated by z. A similar construction can be applied to the polar UPS projection. The parameters are as follows:

z: the UTM zone, $x_0 y_0$: the origin of the tiling system, $x_n y_n$: the number of pixels in the tile, $x_b y_b$: the border size of the tile, r: the spatial resolution of the pixel.

Each pixel can be located by its spatial global index offset from the origin of the tiling system $g_i, g_j$, or its index i, j, within a specific tile $t_i, t_j$ (also referred to as column and row).

An example size for tile images (e.g., given current computer architectures and memory storage capacities) $x_n, y_n$ is approximately 4096×4096 pixels. Since a UTM zone is 6 degrees across, that represents 668 km at the equator. For pixel scales $x_r$ larger than approximately 200 meters, a single tile will cover the east-west extent of a UTM zone. For smaller pixel scales, multiple tiles are required. For example, for r=10 m resolution (e.g., Sentinel-2), seventeen 4096 pixel wide tiles would be required $$\left( \frac{668 \text{ km} * 1000 \text{ m}/10 \text{ m}}{4096} \right).$$

In the y-dimension, the distance from the equator to the pole is near 10000 km, so the number of 4096×4096 tiles to span that distance is approximately 10 for a 250 m pixel tile, and 244 for a 10 m tile. The southern hemisphere can be handled with a similar number of tiles using a negative index referenced from the equator, or referenced by their northing coordinate from the south pole using the southern "S" designator for the zone.

There are several potential choices for the origin of the tiling. The first uses the native UTM 0,0 as the origin, which is at the intersection of the false easting of the zone (500 km) and the equator. One drawback of this choice is that the tiles are not symmetric within a zone. Another choice is to use the intersection of the central meridian of the zone with the equator, which is located at UTM $x_0 y_0 = 500000, 0$.

The border size represents overlap with adjacent tiles, which allows the reduction of "edge" effects for processing which requires neighboring pixels. One choice is to use some fraction of the tile size to reduce duplicate storage. For a 4096×4096 tile, an example choice is some power of 2 between 32 and 256.

There are also various choices for the optimal pixel resolution "r." One approach is to accommodate as many sensors as possible using powers of two of a fundamental resolution. Examples of such tilings are as follows:

r=5 m accommodates RapidEye and PlanetScope (native 5 m), and Sentinel-2 (native 10 m/20 m).

r=15 m accommodates pan-sharpened Landsat 7/8 (15 m), Landsat 5/7/8 (native 30 m), and MODIS (240 m).

For high-resolution sensors (e.g., NAIP aerial photography at 1 m resolution), r=1 m can be used as the fundamental tiling, with small interpolation adjustments as needed to accommodate the existing sensors (e.g., with RapidEye and PlanetScope adjusted to 4 m (level 2), Sentinel-2 to 8 m (level 3), pan-sharpened Landsat at 16 m (level 4), Landsat at 32 m (level 5), and MODIS at 256 m (level 8)) (level 8).

Example Conversion to Pixel/Tile Index

The following example shows an assignment of a specific WGS84 latitude/longitude from the MODIS sensor to a pixel and tile. Longitude −106.3017 and Latitude 35.8785 is UTM Zone 13N Easting 382497.99 Northing 3971254.80. For a pixel resolution of 1 meter, this would fall in the pixel whose upper left corner is at 382497, 3971255 which is identical to the zone pixel $g_i, g_j$ address. For a pixel resolution of 240 meters, the sample would be in the pixel with upper left location 382320, 3971280 and $g_i, g_j$ address 1593, 16547. The global pixel indices can be calculated via $$g_i = r * \left\lfloor \frac{\text{Easting}}{r} \right\rfloor \text{ and } g_j = r * \left\lfloor \frac{\text{Northing}}{r} + 1 \right\rfloor.$$

The corresponding tile indices for r=1, $x_0=0$, $y_0=0$, $x_n=4096$, $y_n=4096$ are $t_i=93$, $t_j=970$. Using a central meridian origin ($x_0=500000$), $t_i=-29$, $t_j=970$. For the MODIS 240 m pixel and $x_n=4096$, $y_n=4096$, $t_i=0$, $t_j=5$. The tile indices can be calculated from the pixel indices via $$t_i = \left\lfloor \frac{g_i}{x_n} \right\rfloor \text{ and } t_j = \left\lfloor \frac{g_j}{y_n} + 1 \right\rfloor.$$

Tile indices are mapped to a string which is part of the file name (along with date of acquisition and sensor) stored in a long-term storage 1212 (e.g., Google Cloud Storage or Amazon S3). An example for MODIS would be "2006-06-09-1800_12N_12_MO_09qkm.jp2," which was collected on Jun. 9, 2006 at 18:00 UTC in Zone 12N with $t_j=12$ by the Tena sensor. There is no $t_i$ because a tile covers the entire E-W span of the zone. An example for Landsat 7 would be "2015-01-18-L7-034033_13N_007_069_321.jp2" which was collected on Jan. 18, 2015 from zone 13N with $t_i=7$ and $t_j=69$.

Ingestion Process

FIG. 12 depicts an example environment for processing and analyzing data in accordance with techniques described herein. Platform 1202 includes an ingestor module 1208 (comprising one or more Google Compute Engine instances and a Celery master). Ingestor module 1208 connects (e.g., via one or more networks depicted in FIG. 12 as a single network cloud 1214) to various sources of observational data. Two examples shown in FIG. 12 are NASA FTP site 1204, and a proprietary repository 1206 (e.g., storing aerial photography). Ingestor module 1208 retrieves data (e.g., using the FTP protocol) from the repositories and writes them to storage 1212 (e.g., creating a local minor of the retrieved data).

The following is an example of how ingestor 1208 obtains data, and in this particular example, the ingestion of MODIS data. As explained throughout the Specification, other sources of data (in other formats) can also be processed using embodiments of the techniques described herein.

In various embodiments, ingestor module 1208 executes a shell script that manages ingestion. The shell script executes (e.g., as a cronjob running every four hours) and launches an LFTP process to obtain a directory listing of FTP site 1204. Ingestor module 1208 identifies files that are new since the last time the script ran, by parsing the directory listing into a list of potential files to retrieve, and then checking against a Redis database 1216 to see whether the files were previously retrieved. Previously retrieved files are ignored, and threads are started to download any new items. In an example operation, 50 to 100 new files are identified in NASA's MODIS collection each time the ingestor script executes (depending, e.g., on when NASA's MODIS processing occurs). Each raw MODIS Hierarchical Data Format (HDF) file obtained from FTP site 1204 is approximately 140 MB. Multiple files can be downloaded in parallel (e.g., using threads), and locks can be used to prevent multiple threads from trying to download the same file simultaneously. In the event the download fails (e.g., due to a network connectivity problem, or if the file length is not correct when it is finished), the script can restart the download as needed. Newly seen files are copied to storage 1212 and entries are made in Redis database 1216 (e.g., using python) indicating the new files as having been downloaded successfully.

The raw data (e.g., MODIS data obtained from NASA) is stored in "granules." In various embodiments, every pixel in a granule is stored. In other embodiments, a cloud mask (included by NASA with the granule) is used to shrink the number of pixels stored. The following is an example file name for a granule stored in storage 1212, and minors NASA's nomenclature:

gs://modis/allData/6/MOD02QKM/2015/200/ MOD02QKM.A2015200.0040.006.2015200134321.hdf The components of the path name are:
gs://: Google Storage designator
modis: storage bucket
allData: (inherited from NASA storage path)
6: collection number (equivalent to a NASA version number)
MOD02QKM: data type (MODIS 02 quarter kilometer (250 m) bands)
2015: year
200: Julian day of year
MOD02QKM.A2015200.0040.006.2015200134321.hdf: a file name assigned by NASA using NASA's naming scheme In an example embodiment, platform 1202 handles twelve types of data granules, each produced every five minutes over daylight portions of the globe. There are approximately 1,728 new files per day, 630,000 files per year, and 10 million files total.

An example of pseudocode for ingesting data (e.g., from site 1204 by ingestor module 1208) is shown in FIG. 13. An example of pseudocode of preprocessing data (e.g., by preprocessor 1210 of the data ingested by ingestor module 1208) is shown in FIG. 14.

Pre-Processing

Pre-processing module 1210 (also comprising one or more Google Compute Engine instances and a Celery master) takes all of the newly retrieved files (e.g., the 50 to 100 MODIS files obtained by ingestor 1208 every four hours) and pre-processes them. In various embodiments, pre-processing executes as a cron job (e.g., every four hours), and executes as a first portion of the process the ingestion processing described above. Pre-processing can also be triggered by an event, such as the appearance in a particular directory of new data.

A given granule can be split into smaller tiles (e.g., approximately twenty tiles) by pre-processor module 1210. The smaller tiles are easier to perform various operations on by platform 1202. Pre-processor module 1210 can also process large repositories of historical data (e.g., the last n years of data stored with NASA FTP site 1204) by performing a parallel run using an appropriate number of nodes (e.g., 200 multi-processor nodes). The Celery system distributes the workload over the (e.g., 200) nodes, with each node executing the same script as is executed for the newly-seen files (but in parallel).

The following is an example file name for a .xz file stored in storage 1212:

gs://modis-icz/utm_v7q_09/15N/03/2015-06-20-1935-MY_15N_03.bin.xz

The components of the path name are:
gs://: Google Storage designator
modis-xz: storage bucket
utm_v7q_09: type and version
15N: zone
03: tile y index
2015-06-20-1935-MY_15N_03.bin.xz: file name An .xz file comprises an array of N samples. The samples are x and y coordinates as 16-bit unsigned integers quantized to 30 UTM pixel indices, followed by b bands of pixel location (DN) values. The array of N samples is compressed using the Lempel-Ziv-Markov chain compression technique. As previously mentioned, a given granule may have associated with it a cloud mask provided by the original data source (e.g., a NASA provided cloud mask). In such a scenario, the cloud mask can be used to reduce the number of points included in the .xz file, with the file structure remaining the same.

The .xz tiling process can be bypassed, as applicable, and JPEG2000 compressed image tiles can be created directly from the raw MODIS data using an appropriate interpolation method. The following is an example file name for a .jp2 file stored in storage 1212:

gs://descartes-modis/2015-07-29-1620_16N_09_MO_09qkm.jp2

The components of the path name are:
gs://: Google Storage designator
descartes-modis: storage bucket
2015-07-29-1620_16N_09_MO_09qkm.jp2: file name, date, time, zone, row, sensor, data type, and file type.

In various embodiments, additional (optional) preprocessing is performed (e.g., prior to the .xy tile being written). One example of such additional processing is scaling DN values to top of atmosphere reflectance. The physical meaning of the numbers associated with each pixel location (DN) varies by sensor. Various operations (e.g., performing cloud removal, described in more detail below) make use of values which represent reflectance as observed at the top of the atmosphere. Some sensors, such as Sentinel-2, deliver data in this format, and do not require scaling. Sensors such as MODIS and Landsat, however, deliver data in radiance units, which require various scaling to obtain reflectance. The metadata associated with the image data contains some of the appropriate constants, while others (such as the distance from the sun to the earth) can be tabulated from other sources as needed. The conversion formula to reflectance in the range of 0.0 to 1.0 is:

$$gain = \frac{(LMAX - LMIN)}{(QCALMAX - QCALMIN)}$$

$$bias = LMIN - gain * QCALMIN$$

$$toar_f = \frac{\pi * \text{earth\_sun\_distance\_in\_au}^2}{\text{sol\_irrad} * \cos(\text{solar\_zenith\_angle})}$$

$$scaledDN = DN * toar_f * gain + toar_f * bias.$$

To store the reflectance in a 16-bit integer, it is scaled by an additional factor of 10000.

3. Creating Images with Reduced Atmospheric Obstructions

Figure 15A:
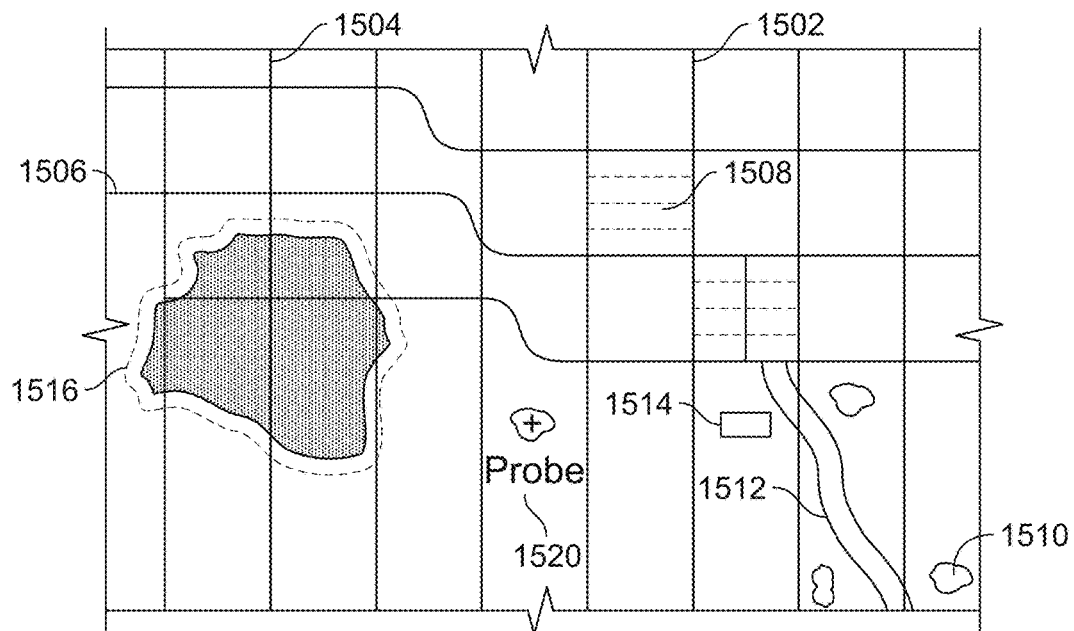
FIG. 15A illustrates an example portion of the Earth as viewed from above (e.g., by a satellite).

FIG. 15A illustrates an example of a portion of the Earth as viewed from above (e.g., by a satellite). Suppose FIG. 15A illustrates a portion of Iowa. Lines such as 1502, 1504, and 1506 are gravel roads—generally spaced one mile apart. Other elements visible (e.g., to a satellite) are fields, such as field 1508, tree 1510, river 1512, and house 1514. Region 1516 of FIG. 15A is obscured by clouds. In some cases, an obstruction (such as a cloud) may completely obscure the ground underneath it. In such a scenario, the optical depth can be represented as a "0," indicating that an obstruction can't be seen through. Correspondingly, a cloudless (i.e., completely visible) portion of ground can be considered as having an optical depth of "1." For some datasets (e.g., Landsat), a cloud mask accompanies the granule (e.g., as obtained from site 1204), indicating for a given pixel (in a binary manner) whether the pixel represents a cloud or not.

Figure 15B:
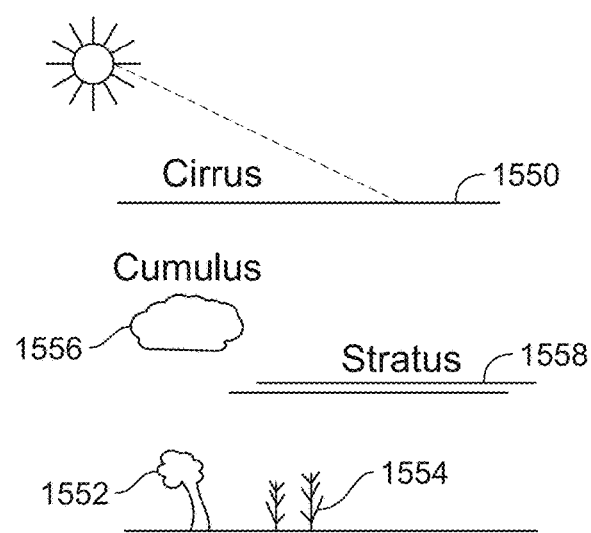
FIG. 15B illustrates an example portion of the Earth as viewed from the side.

As shown in FIG. 15B, clouds can take a variety of forms, and different types of clouds (or other atmospheric obstructions, such as smoke, snow, and smog) can conceal the ground beneath them in different ways and to different degrees. In FIG. 15B, a tree (1552) and corn plants (1554) are shown. Example clouds are also shown, such as a cumulus cloud 1556 (which will be opaque in the center part, but have fuzzy edges), low foggy stratus clouds (1558), and very high cirrus clouds 1550 (where the sun shines through the cloud but the illumination is affected by the cloud).

As mentioned above, sometimes the cloud may completely obstruct what is underneath it, and sometimes the view may be completely unobstructed. Sometimes, the optical depth value is inconclusive/insufficient to articulate whether a pixel is a cloud or not. For example, around the edges of pixels that have optical depths of 0 or 1, there will typically be pixels with optical depths somewhere in between 0 and 1 (e.g., 0.276). In some embodiments, a "cloud" pixel is defined as a pixel with an optical depth of less than 0.4 (or another appropriate value), and used as a mask. Cloud masks can also be more than 1 bit (e.g., 2 or 3 bits, indicating cloud, not cloud, or maybe cloud), per pixel.

One value that can be used in image processing/analysis is the normalized difference vegetation index (NDVI), which is a ratio $$\frac{NIR - VIS}{NIR + VIS},$$

where VIS and NIR stand for the spectral reflectance measurements acquired in the visible (red) and near-infrared regions. If a cloud affects each of these bands equally (e.g., it reduces each one by 10%), the ratio is unchanged. As an example, dust in the atmosphere scatters blue light more preferentially than green and red light. A cloud that affects red more than infrared will change the vegetation index. But, if that change occurs evenly across the whole scene, a correction can potentially be applied. For example, if a probe 1520 is present for which the NDVI is known, and a different NDVI value is measured, if a sufficient number of probes are present in the scene, it could be possible to correct the whole scene for whatever obscuration is happening that is impacting the red and the infrared differently. Accordingly, a refinement to the definition of a "cloud" is something that affects NDVI in an uncorrectable way.

One approach to mitigating cloud cover (and other atmospheric obstructions) in imagery is to use the temporal dimension. Satellites (and other image sources) have a temporal period. For example, a given satellite might be above a given portion of land every 16 days. There may also be multiple satellites (e.g., two satellites), taking images on alternate days, where on one of the days the satellite will be directly above a region, and alternate days the satellite will be off to one side or another. Accordingly, for a given pixel, there could exist 20 observations, collectively, by various satellites over a 16 day period. Of those 20 observations of a given pixel, many may be masked out because of clouds (or other atmospheric obstructions). However, of those 20 observations of a given pixel, one pixel is the "best" pixel (e.g., the least obstructed). And, a composite image of an area can be created using data associated with each of the "best" pixels from a sequence of images covering the area, using techniques described in more detail below. The "best" pixel can be considered the one in a set (e.g., a time series) for which given spectral information associated with that pixel was last obscured by atmospheric obstruction.

Figure 16:
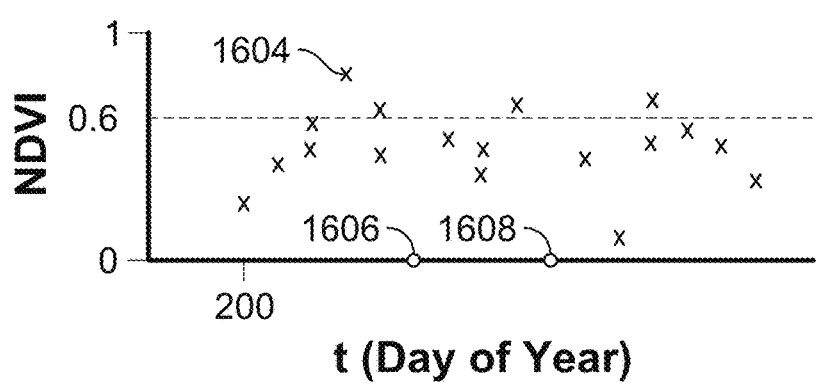
FIG. 16 illustrates a set of NDVI values for a given pixel in a sixteen day period.

A variety of approaches can be used to select the "best" pixel. One example is to use the NDVI value associated with the pixel (a one-sided error distribution). FIG. 16 illustrates a set of twenty NDVI values observed for a given pixel in a sixteen day period (starting on the 200$^{th}$ day of the year). While an NDVI value can range from −1 to 1, in this example, values below 0 have been excluded. In the sixteen day period, four "cloud free" observations are present (the points above the threshold NDVI line, set in this example at 0.6). Of those four observations, the observation on day 203 (1604) of the particular pixel being examined has the highest NDVI value (1604) and is thus the "best" pixel in the sixteen day sequence. For a given pixel in a given sequence of images, in some cases, no data may be present. One reason for the missing data is that a cloud mask (e.g., provided by NASA and described above) was applied. Another reason for missing data is that aberrations (due to satellite position) yield unusable image information. Suppose days 205 and 209 are missing data for the pixel being examined in FIG. 16. In various embodiments, the NDVI values of pixels with missing data is set to zero (e.g., as shown at 1606 and 1608). Other examples of "obstructions" that can be reduced in accordance with techniques described herein include digital defoliation (e.g., selecting for the pixel least obscured by plant cover using an appropriate index) and using a water index to select for a maximum (or minimum) value to see a composite image of the ground at its wettest (or driest) as applicable.

The use of the NDVI value for cloud detection relies on the fact that clouds are spectrally "flat." In other words, the reflectance for each band is similar. This is equivalent to clouds being white, or a shade of gray. The formula for $$NDVI \frac{NIR - VIS}{NIR + VIS}$$

means clouds have an NDVI value near zero, since the terms in the numerator cancel. Selecting maximum value pixels is particularly effective with vegetation, which have NDVI values which are much higher, since near-infrared (NIR) reflectance is much larger than red (VIS) reflectance. The same approach works for other differential indexes such as the normalized difference water index (NDWI), normalized difference snow index (NDSI), shortwave infrared $$\left(\frac{SWIR - VIS}{SWIR + VIS}\right),$$

or various permutations of differential vegetation index (e.g., using visible green instead of visible red). Other cloud rejection algorithms can work using other features of clouds. For example, since clouds are white or gray and are usually brighter than land cover they can be rejected over a background which is not white or gray by using a HSV (hue/saturation/value) decomposition of the RGB (red/green/blue) values and selecting pixels which are the lowest value or the lowest saturation.

Figure 17:
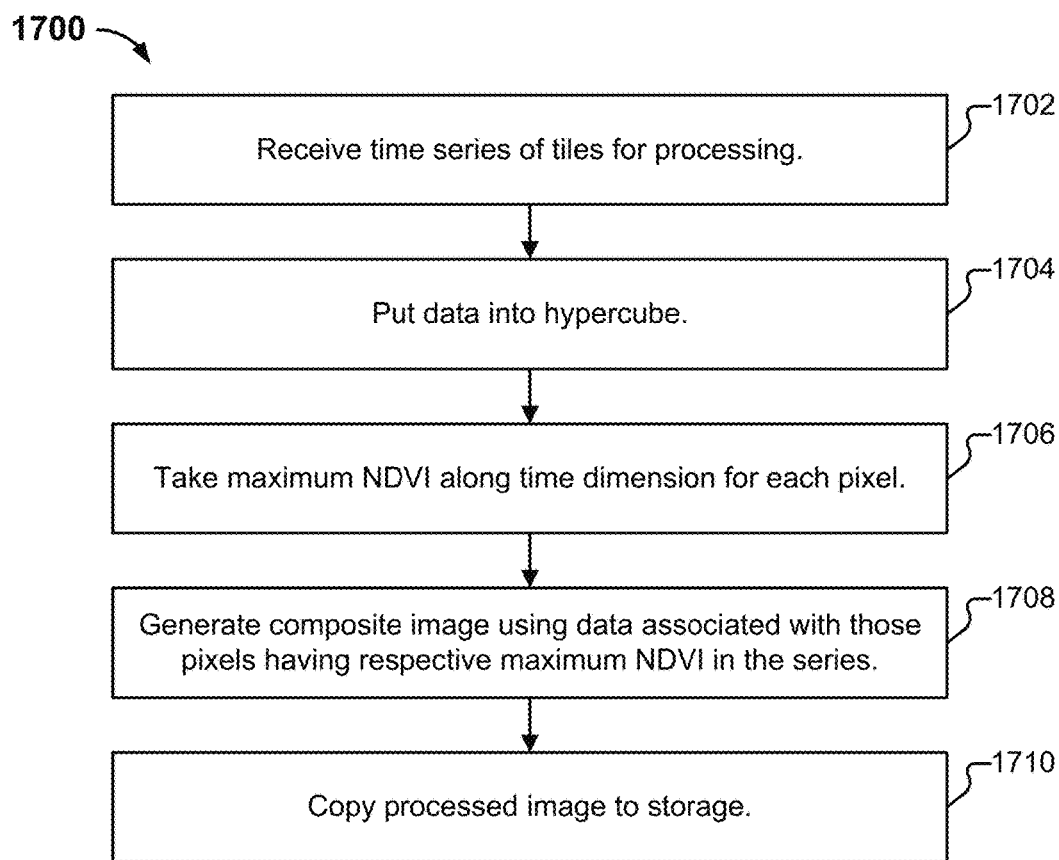
FIG. 17 illustrates an example of a process for creating a composite image.

FIG. 17 illustrates an example of a process for creating a composite image. In various embodiments, process 1700 is performed by image creator module 1218.

The process begins at 1702, when a first tile is received for processing, and the previous fifteen (or other appropriate number of) tiles in a time series are also received. As one example, at 1702, image creator module 1218 (comprising one or more Google Compute Engine instances and a Celery master), determines that a recently preprocessed tile (e.g., an output of preprocessor module 1210) is available and retrieves that tile for additional processing. The images corresponding to the previous fifteen days' worth of that particular tile are also retrieved. As another example, pre-determined time sequences of tiles (e.g., days 0-15, 16-31, etc.) are selected for processing (e.g., as the days elapse).

At 1704, a data hypercube is created by stacking each of the multi-band image tiles. In one example, the data hypercube created at 1704 is 4-dimensional, with the dimensions being pixel dimension (e.g. Red, Green, Blue, Near Infrared, NDVI, Collection date), x-dimension, y-dimension, and time dimension. As process 1700 progresses, the time dimension is compressed to a single layer, and the data is reduced to a cube of values, or a 2-dimensional plane for each image component as applicable.

At 1706, the maximum NDVI is taken along the time dimension (e.g., by a python script). As a simplified example of the processing performed at 1706, suppose the data being operated on at 1706 includes a 3×3 image plane for the NDVI component on a particular day, and that only a total of two days' worth of tiles are used in the time series. Example data for a first day is as follows:

0 143 199
10 155 202
12 147 198

Example data for the second day for the NDVI plane is as follows:

20 122 204
10 157 199
11 141 206

After taking the maximum NDVI over the two days, the image plane would be:

20 143 204
10 157 202
12 147 206.

At 1708, a composite image is generated. As mentioned above, the maximum NDVI is used to determine, for a given pixel position (e.g., 1×1, 3×3), which image's pixel in that position was the most cloud free in the time series. At 1708, the spectral information associated with the "best" pixel (e.g., the one having the maximum NDVI for that pixel position in the set) is used to generate the composite image.

In various embodiments, additional metadata is included in the composite image. For example, the particular day of the year that was selected as the "best" for each pixel can be stored (e.g., day 203). As another example, the total number of valid observations that were considered can be stored. An example of a "valid" observation is any of the non-zero observations seen in represented in FIG. 16 (i.e., not 1606 or 1608).

Finally at 1710 the processed image is stored (e.g., to storage 1212). The following is an example file name for a composite image file:
gs://modis-max/utm_v7r_max/2015/max_2015_df200_15N_03_v7r.tif
The components of the path name are:
gs://: Google Storage designator
modis-max: storage bucket for
utm_v7r_max: type and version
2015: year
max_2015_df200_15N_03_v7r.tif: file name, with day=200, 15N=zone, and row=3

In some embodiments, there is one composite image per tile per day, with approximately 1200 MODIS tiles covering the globe. The resulting composite image can store a variety of features in a single or multiple bands as applicable. For example, the resulting composite image can store a single scalar feature in a single band, or can store one or more vector features in multiple bands.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a set of data comprising at least a first image tile and a second image tile, wherein values included in the first image tile and the second image tile correspond to top of atmosphere reflectance values, wherein the first tile and second tile respectively include, at an arbitrary pixel position, multispectral image data, and wherein the multispectral image data at the arbitrary pixel position comprises at least: (1) a first value corresponding to a measurement of a first spectral band and, (2) a second value corresponding to a measurement of a second spectral band that is different from the first spectral band;
determine, that for a first pixel position, the first tile includes a first pixel at the first pixel position that has, within the multispectral image data associated with the first pixel position, a value that exceeds a value within the multispectral image data associated with a second pixel located in the second tile at the first pixel position;
determine, for a second pixel position, that the second tile includes a third pixel at the second pixel position that has, within the multispectral image data associated with the second pixel position, a value that exceeds a value within the multispectral image data associated with a fourth pixel located in the first tile at the second pixel position; and
generate a composite image, including by selecting, for each pixel position in the composite image, multispectral image data that includes a maximum value for the pixel position across the tiles included in the set and wherein multispectral image data for the first pixel position in the composite image is obtained from the multispectral image data associated with the first pixel in the first tile and wherein multispectral image data for the second pixel position in the composite image is obtained from the multispectral image data associated with the third pixel in the second tile; and a memory coupled to the processor and configured to provide the processor with instructions.

2. The system of claim 1 wherein a one-sided error distribution is used by the processor in the determination made for the first pixel position.

3. The system of claim 2 wherein the one-sided error distribution comprises a normalized difference vegetation index.

4. The system of claim 3 wherein the normalized difference vegetation index uses visible green data.

5. The system of claim 2 wherein the one-sided error distribution comprises a normalized difference water index.

6. The system of claim 2 wherein the one-sided error distribution comprises a normalized difference snow index.

7. The system of claim 2 wherein the one-sided error distribution comprises a shortwave infrared index.

8. The system of claim 1 wherein the first tile and the second tile are included in a time series.

9. The system of claim 1 wherein the composite image includes less atmospheric obstruction than the first tile and the second tile include individually.

10. The system of claim 9 wherein the atmospheric obstruction comprises cloud cover.

11. The system of claim 1 wherein the processor is further configured to determine whether at least a portion of the multispectral image data associated with the second pixel located in the second tile at the first pixel location is missing, and set a value associated with the missing data to zero.

12. The system of claim 1 wherein the composite image includes less plant cover obstruction than the first tile and the second tile include individually.

13. The system of claim 1 wherein the processor is further configured to use a hue/saturation/value decomposition of red/green/blue values in determining that the first pixel at the first pixel position has a value that exceeds the second pixel at the first pixel position.

14. A method, comprising:
receiving a set of data comprising at least a first image tile and a second image tile, wherein values included in the first image tile and the second image tile correspond to top of atmosphere reflectance values, wherein the first tile and second tile respectively include, at an arbitrary pixel position, multispectral image data, and wherein the multispectral image data at the arbitrary pixel position comprises at least: (1) a first value corresponding to a measurement of a first spectral band and, (2) a second value corresponding to a measurement of a second spectral band that is different from the first spectral band;
determining, that for a first pixel position, the first tile includes a first pixel at the first pixel position that has, within the multispectral image data associated with the first pixel position, a value that exceeds a value within the multispectral image data associated with a second pixel located in the second tile at the first pixel position;
determining, for a second pixel position, that the second tile includes a third pixel at the second pixel position that has, within the multispectral image data associated with the second pixel position, a value that exceeds a value within the multispectral image data associated with a fourth pixel located in the first tile at the second pixel position; and generating a composite image, including by determining, for each pixel position in the composite image, multispectral image data from whichever tile has, at that pixel position, multispectral image data that includes a value that is the greatest among values for that pixel position across the tiles included in the set of data, and wherein multispectral image data for the first pixel position in the composite image is obtained from the multispectral image data associated with the first pixel in the first tile and wherein multispectral image data for the second pixel position in the composite image is obtained from the multispectral image data associated with the third pixel in the second tile.

15. The method of claim 14, wherein a one-sided error distribution is used in the determination made for the first pixel position.

16. The method of claim 15, wherein the one-sided error distribution comprises a normalized difference vegetation index.

17. The method of claim 16 wherein the normalized difference vegetation index uses visible green data.

18. The method of claim 15 wherein the one-sided error distribution comprises a normalized difference water index.

19. The method of claim 15 wherein the one-sided error distribution comprises a normalized difference snow index.

20. The method of claim 15 wherein the one-sided error distribution comprises a shortwave infrared index.

21. The method of claim 14 wherein the first tile and the second tile are included in a time series.

22. The method of claim 14 wherein the composite image includes less atmospheric obstruction than the first tile and the second tile include individually.

23. The method of claim 22 wherein the atmospheric obstruction comprises cloud cover.

24. The method of claim 14 further comprising determining whether at least a portion of the multispectral image data associated with the second pixel located in the second tile at the first pixel location is missing, and set a value associated with the missing data to zero.

25. The system of claim 14 wherein the composite image includes less plant cover obstruction than the first tile and the second tile include individually.

26. The method of claim 14 wherein the processor is further configured to use a hue/saturation/value decomposition of red/green/blue values in determining that the first pixel at the first pixel position has a value that exceeds the second pixel at the first pixel position.

27. A computer program product embodied in a tangible, non-transitory computer readable storage medium and comprising computer instructions for:
receiving a set of data comprising at least a first image tile and a second image tile, wherein values included in the first image tile and the second image tile correspond to top of atmosphere reflectance values, wherein the first tile and second tile respectively include, at an arbitrary pixel position, multispectral image data, and wherein the multispectral image data at the arbitrary pixel position comprises at least: (1) a first value corresponding to a measurement of a first spectral band and, (2) a second value corresponding to a measurement of a second spectral band that is different from the first spectral band;
determining, that for a first pixel position, the first tile includes a first pixel at the first pixel position that has, within the multispectral image data associated with the first pixel position, a value that exceeds a value within the multispectral image data associated with a second pixel located in the second tile at the first pixel position;

determining, for a second pixel position, that the second tile includes a third pixel at the second pixel position that has, within the multispectral image data associated with the second pixel position, a value that exceeds a value within the multispectral image data associated with a fourth pixel located in the first tile at the second pixel position; and generating a composite image, including by selecting, for each pixel position in the composite image, multispectral image data from whichever tile has, at that pixel position, multispectral image data that includes a value that is the greatest among values for that pixel position across the tiles included in the set of data, and wherein multispectral image data for the first pixel position in the composite image is obtained from the multispectral image data associated with the first pixel in the first tile and wherein multispectral image data for the second pixel position in the composite image is obtained from the multispectral image data associated with the third pixel in the second tile.

\* \* \* \* \*